US012168872B2

(12) United States Patent
Damiani et al.

(10) Patent No.: US 12,168,872 B2
(45) Date of Patent: Dec. 17, 2024

(54) THREE-DIMENSIONAL HELICOIDAL POST-TENSIONING AND REINFORCEMENT STRATEGY FOR CONCRETE ANCHOR APPLICATIONS

(71) Applicant: RRD Engineering LLC, Arvada, CO (US)

(72) Inventors: Rick Damiani, Arvada, CO (US); Max Franchi, Pescara (IT)

(73) Assignee: The Floating Wind Technology Company, LLC, Arvada, CO (US)

( * ) Notice: Subject to any disclaimer, the term of this patent is extended or adjusted under 35 U.S.C. 154(b) by 469 days.

(21) Appl. No.: 17/494,810

(22) Filed: Oct. 5, 2021

(65) Prior Publication Data

US 2022/0106020 A1 Apr. 7, 2022

Related U.S. Application Data

(60) Provisional application No. 63/087,477, filed on Oct. 5, 2020.

(51) Int. Cl.

| | |
|---|---|
| ***E04C 5/12*** | (2006.01) |
| ***B28B 1/02*** | (2006.01) |
| ***B63B 21/27*** | (2006.01) |

(52) U.S. Cl.

CPC ................ *E04C 5/122* (2013.01); *B28B 1/02* (2013.01); *B63B 21/27* (2013.01)

(58) Field of Classification Search

CPC ... E04C 5/00; E04C 5/122; E04C 3/00; E04C 3/26; B63B 21/00; B63B 21/27;

(Continued)

(56) References Cited

U.S. PATENT DOCUMENTS 3,893,270 A * 7/1975 Schupack ................ E04B 1/32 52/80.1
4,092,038 A 5/1978 Harris (Continued)

FOREIGN PATENT DOCUMENTS

KR 20160002157 U 6/2016
WO 2014175751 A1 10/2014
WO WO-2020176262 A2 * 9/2020 ............ B28B 1/001

OTHER PUBLICATIONS

Damiani, Rick et al. "3D Printed Concrete Suction Anchor (3DSA)", Poster presented at International Offshore Wind Partnering Forum (IPF), Providence, Rhode Island, Apr. 21-25, 2020, 1 pg.

(Continued)

*Primary Examiner* — Lars A Olson

(74) *Attorney, Agent, or Firm* — LOZA & LOZA, LLP

(57) ABSTRACT

Concrete suction anchor including a cylindrical structure (100) that has a lateral cylindrical wall and a longitudinal axis, wherein the cylindrical structure (100) is open at a bottom end and closed at a top end, wherein the cylindrical structure (100) defines a main cavity (115; 175; 730) open at the bottom end, wherein said lateral cylindrical wall of the cylindrical structure (100) includes a plurality of internal channels housing at least one pair of sets of post-tensioning tendons (125, 130), wherein a first set of post-tensioning tendons (125) is inclined with respect to said longitudinal axis by a first angle opposite to a second angle according to which a second set of post-tensioning tendons (130) is inclined with respect to said longitudinal axis, wherein each of said first and second angles has an absolute value larger than 0° and lower than 90°.

17 Claims, 16 Drawing Sheets

(58) Field of Classification Search
CPC .. B28B 1/00; B28B 1/001; B28B 1/02; B28B 21/00; B28B 21/02; B28B 23/00; B28B 23/02
USPC .......................................................... 114/296
See application file for complete search history.

(56) References Cited

U.S. PATENT DOCUMENTS

| | | | |
|---|---|---|---|
| 5,927,904 | A | 7/1999 | Treu et al. |
| 2009/0123235 | A1 | 5/2009 | Maconochie et al. |

OTHER PUBLICATIONS

Damiani, Rick; Document submitted to National Science Foundation, (Aug. 15, 2019), 6 pgs.
PCT/IB2021/059131, International Search Report and Written Opinion, Feb. 1, 2022, 10 pgs.

* cited by examiner

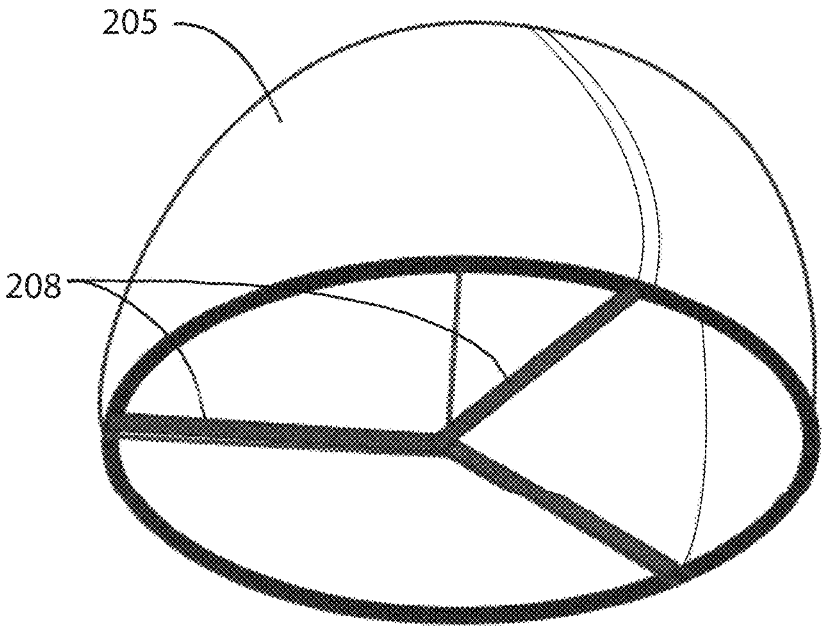
Fig. 5
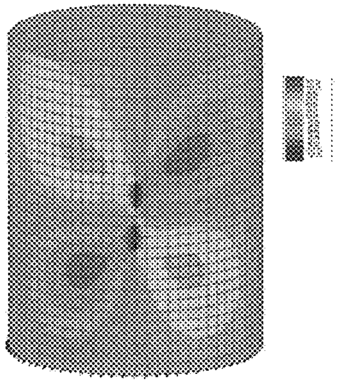
Fig. 13A
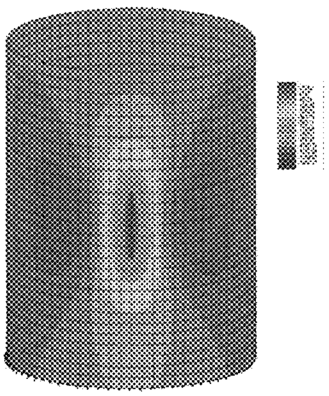
Fig. 13B
Fig. 13

860
105
100
A

B
C

SECTION B-B

SECTION C-C
180
182
184
185
186
188
710
720
770
780

SECTION A-A

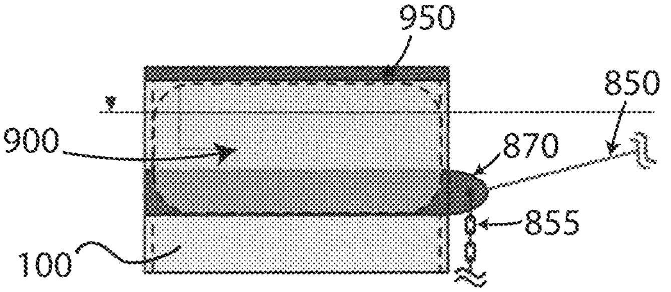
Fig. 9A
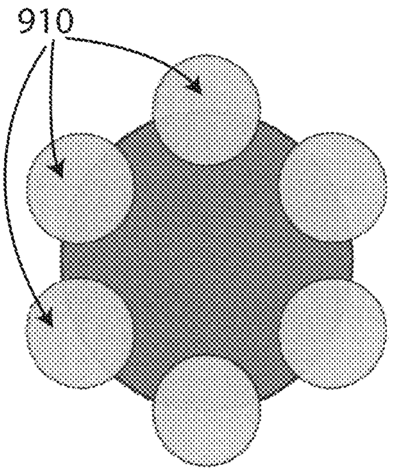
Fig. 9C
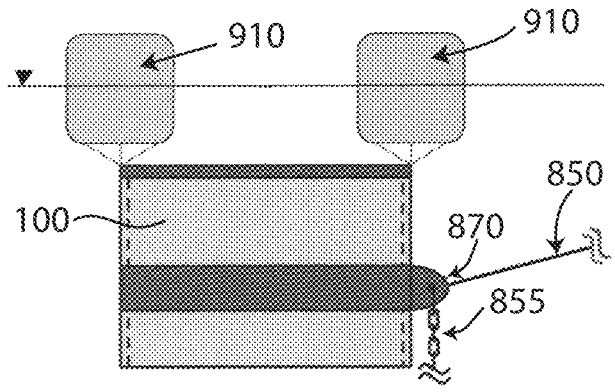
Fig. 9B
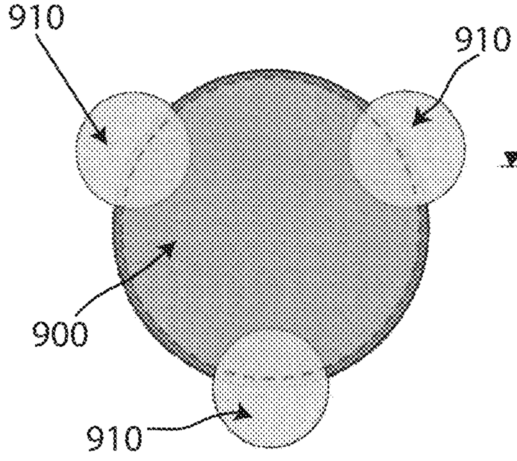
Fig. 9E
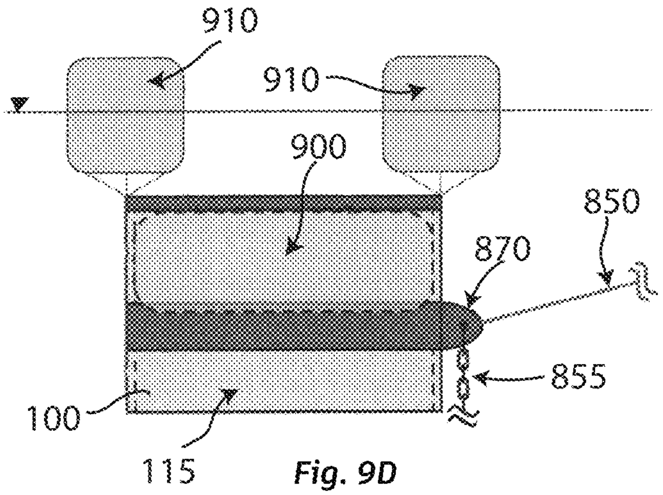
Fig. 9D
Fig. 9

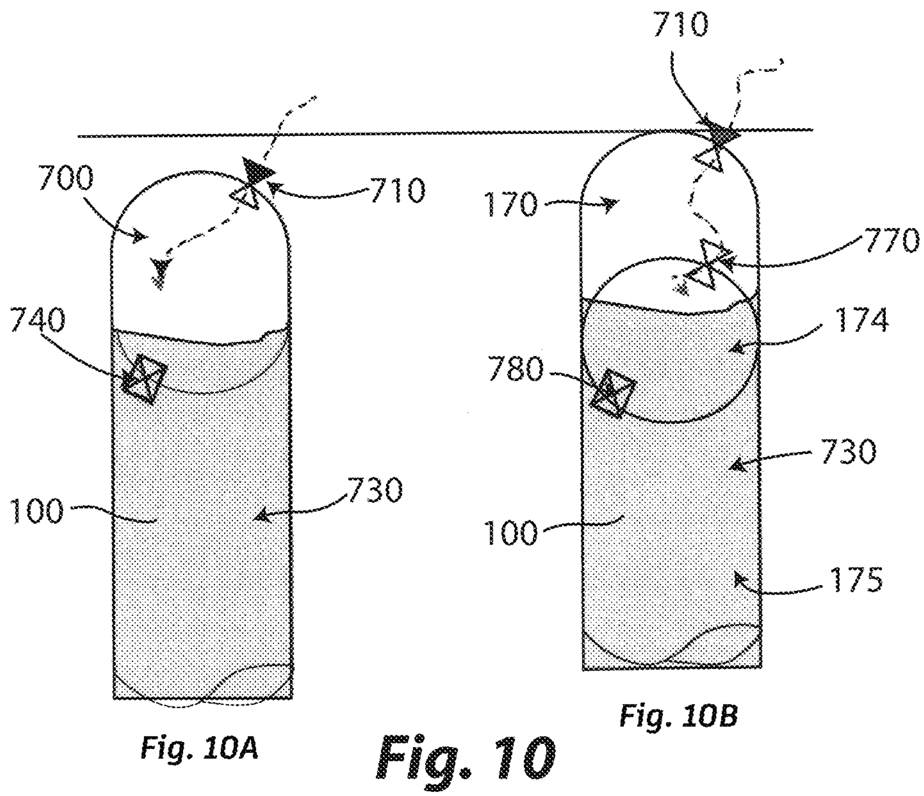
Fig. 10A
Fig. 10B
Fig. 10
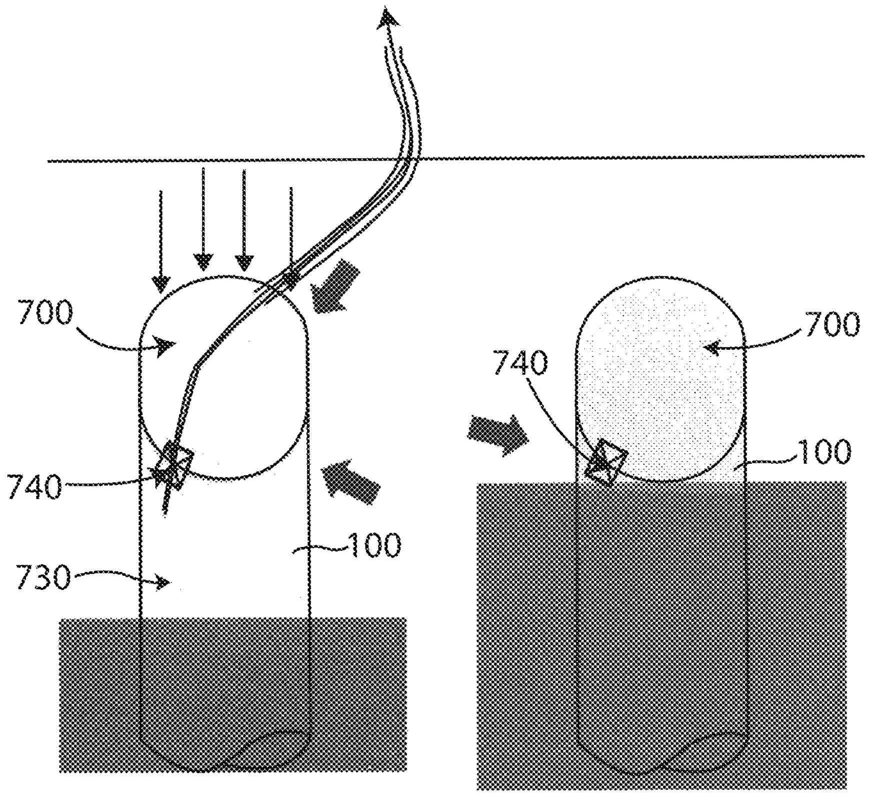
Fig. 11A
Fig. 11B
Fig. 11

THREE-DIMENSIONAL HELICOIDAL POST-TENSIONING AND REINFORCEMENT STRATEGY FOR CONCRETE ANCHOR APPLICATIONS

TECHNICAL FIELD

The present invention concerns a concrete suction anchor, provided with post-tensioning tendons, that is reliably and effectively applicable to many different environmental settings, easy to manufacture, inexpensive to manufacture, transport and install.

BACKGROUND

Oil and gas and renewable energy floating systems benefit from anchoring for station keeping during operation, power production, and parked/idling conditions. Fundamentally, anchors can be subdivided into two major classes: horizontal and vertical load anchors. The horizontal-load anchors are normally used in combination with catenary mooring, where the mooring line is tangent to the seabed before connecting to the anchor.

Gravity anchors (vertical load) can include large concrete blocks with optional skirts to increase the sliding resistance. However, they suffer from the drawback of having poor efficiency, namely lower than 1 because they can only withstand loads less than their weight. They also require vessels with heavy lift capabilities for transportation and installation.

Drag embedment anchors (horizontal load) offer extremely large lateral resistance and therefore are considered of efficiencies higher than 1, i.e., they can withstand loads higher than their weight. However, they suffer from the drawback of having an extremely poor vertical load resistance. Therefore, they are generally not used with semi-taut or taut mooring.

Plate anchors for vertical and horizontal loads, which are a variation of drag embedment anchors, are installed edgewise and then rotated by pulling the chain until they face broadsided to the uplift, maximizing the uplift resistance. Suction embedded plated anchors are another variation of the drag embedment anchors and they use a suction pile to get driven to the correct depth, and then they open up to offer maximum resistance to uplift (e.g., as disclosed at www.spt-offshore.com). Similarly, to drag-anchors, they must be shape-optimized with relatively complex kinematics to induce the proper embedment and thus installation is expensive. Furthermore, it does not seem possible to replace the steel with other materials for this type of anchor. Another variant involves lateral-load anchors. These plates can be driven edgewise with suction piles that are then removed (e.g., as disclosed at www.intermoor.com). Again, installation is a critical and expensive phase of this system.

Prior art pile anchors for horizontal and vertical load are made of rolled and welded steel plates, and with typical aspect ratio of length-to-diameter higher than 10 and diameters of up to 2 meters. Underwater hammers are normally needed, or pile followers must be used to drive piles from the surface. If the solid stratigraphy reveals presence of rock, pre-drilled sockets and post installation grouting becomes necessary. Again, the installation of these piles is expensive, requiring specialized offshore equipment and lengthy operations. In soft soils, an alternative is offered by suction piles, with lower length-to-diameter ratios than driven piles, and diameters that can reach 10 m. They use hydrostatic pressure to embed and are expensive to manufacture. They can be removed by reversing the suction process. Piles can withstand both vertical, mainly through friction, and lateral loading, namely through soil pressure along the outer surface of the embedment pile. Therefore, semi-taut and taut mooring is possible with piles. Suction piles or suction anchors could be made of reinforced concrete.

However, in the prior art, the applicability of concrete or geopolymer concrete is limited to suction piles and gravity anchors, alternatively or a combination of the two. Very low costs associated with deadweight anchors are offset by more expensive lift-capacity equipment.

Although existing anchoring can be effective in certain situations, still further improvements are desired. Embodiments of the present invention provide solutions for these outstanding needs.

SUMMARY OF THE INVENTION

It is specific subject-matter of the present invention a concrete suction anchor according to the attached claims.

Embodiments of the concrete suction anchor according to the present invention generally relate to the field of anchoring for offshore installation, such as offshore energy installation, including floating offshore energy installation, having post-tensioning tendons oriented so as not only to be parallel or orthogonal to the longitudinal axis of the concrete suction anchor.

Some embodiments of the concrete suction anchor according to the invention are provided with one or more buoyancy chambers, optionally domed buoyancy chambers, for increasing the ease of wet towing of the anchor itself to the installation site by means of a flotation cap.

The concrete suction anchor according to the invention achieves low material and construction cost while delivering an installation process having significantly reduced costs compared to the conventional anchor.

BRIEF DESCRIPTION OF THE DRAWINGS

The present invention will be now described, by way of illustration and not by way of limitation, according to its preferred embodiments, by particularly referring to the Figures of the annexed drawings, in which:

FIG. 5 shows a perspective view of a top dome of a fifth embodiment of the concrete suction anchor according to the invention.

FIG. 8A and FIG. 8B show lateral and front view of the first wet-towing mode of the concrete suction anchor with an inflatable buoyancy unit (800) placed inside the anchor while also utilizing an evacuated buoyancy chamber (110) at the top.

FIG. 8C and FIG. 8D show lateral and front views of a second wet-towing mode of the anchor, which makes use of eight inflatable buoyancy units (four per side) (810) being used on the exterior of the anchor providing additional roll stability.

FIG. 8E and FIG. 8F show lateral and front view of a third mode of wet-towing the anchor, which makes use of both an inner inflatable buoyancy unit (800) paired to the evacuated buoyancy chamber (110) and four additional inflatable buoyancy units (two per side) on the exterior of the anchor.

FIG. 9 schematically shows three additional modes of wet-towing of the concrete suction anchor according to the invention in the case of a low aspect-ratio anchor that gets towed in the vertical position rather than horizontal.

FIG. 9A shows a mode of wet-towing the concrete suction anchor with a steel top lid that makes use of an inner inflatable buoyancy unit (900).

FIG. 9B and FIG. 9C show lateral and top views of an additional wet-towing mode of the low-aspect ratio suction anchor with steel lid, which makes use of six inflatable buoyancy units (910).

FIG. 9D and FIG. 9E show lateral and top views of an additional mode of wet-towing the low-aspect ratio suction anchor with steel lid, which makes use of an inner inflatable buoyancy unit (900) together with additional inflatable buoyancy units (910) placed on the exterior of the anchor.

FIG. 10 schematically shows the operating condition of the concrete suction anchor according to the invention.

FIG. 10A and FIG. 10B schematically show the condition of the anchor and valves/hatches during the sinking of the concrete suction anchor according to the invention when using a two-dome or three dome arrangement, respectively.

FIG. 11 schematically shows the operating condition of embedment of the concrete suction anchor according to the invention.

FIG. 11A and FIG. 11B schematically show the condition of embedment of the concrete suction anchor and valves/hatches according to the invention, where water is removed from the main suction chamber (730) while the buoyancy chamber (700) gets flooded.

FIG. 12 schematically shows the operating condition of disembedment of the concrete suction anchor according to the invention.

FIG. 12A, FIG. 12B, and FIG. 12C schematically show the conditions of the anchor and valves/hatches during removal (extraction) of the concrete suction anchor according to the invention, where water is pumped in the main suction chamber and it is removed from the buoyancy chamber.

FIG. 13 shows results of simulations of stress concentrations on a padeye location of a prior art suction anchor.

FIG. 13A shows results of simulations of stress concentrations on a padeye location of a suction anchor.

FIG. 13B shows results of simulations of stress concentrations on a padeye location of a suction anchor.

FIG. 20 includes FIGS. 20A, 20B, 20C, 20D, and 20E, in which FIG. 20A shows a front view of the concrete suction anchor of FIG. 19 cutout through a plane passing through the longitudinal axis of the concrete suction anchor of FIG. 19; FIG. 20B shows a rear view of the same cutout as FIG. 20A; FIG. 20C shows a rear view of the same cutout as FIG. 20B but with post-tensioning tendons visible: FIG. 20D shows the front view of the same cutout shown in FIG. 20C; and FIG. 20E shows the perspective view of the entire concrete suction anchor of FIG. 19.

In the Figures identical reference numerals will be used for alike elements.

DETAILED DESCRIPTION OF THE INVENTION

Figure 1:
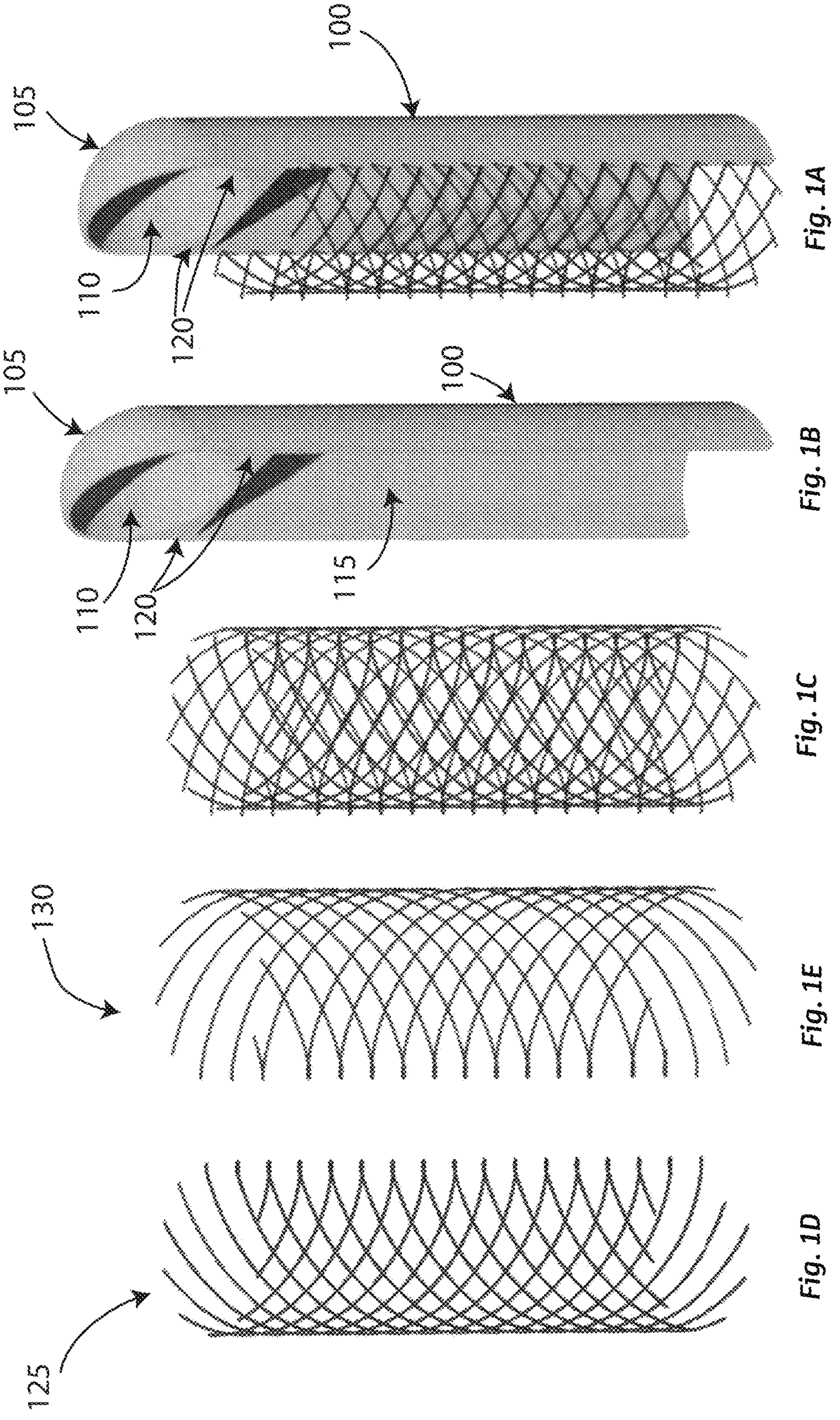
FIG. 1 shows a first embodiment of the concrete suction anchor according to the invention, namely a sectional perspective view along a plane parallel to and passing through the longitudinal axis of the concrete suction anchor wherein the whole post-tensioning tendons are visible (FIG. 1A), the sectional perspective view of FIG. 1A not showing post-tensioning tendons (FIG. 1B), a perspective view of the post-tensioning tendons of the concrete suction anchor (FIG. 1C), a sectional perspective view along a plane parallel to and passing through the longitudinal axis of a first set of the post-tensioning tendons (FIG. 1D) and the opposed sectional perspective view of a second set of the post-tensioning tendons (FIG. 1E).

Making reference to FIG. 1, the first embodiment of the concrete suction anchor according to the invention includes a cylindrical structure 100, open at a bottom end and closed by a top dome 105 at the top end. The top dome 105 defines an internal buoyancy chamber 110 having a substantially spherical shape. The internal buoyancy chamber 110 is separated from the main cavity 115 of the cylindrical structure 100 of the concrete suction anchor by a bottom surface provided with top stiffeners 120 evenly angularly distributed over the circular cross section of the cylindrical section 100, the top edge of which top stiffeners 120 follows the bottom surface of the internal buoyancy chamber 110. The lateral cylindrical wall of the concrete suction anchor, namely the lateral cylindrical wall of the cylindrical structure 100 thereof defining the main cavity 115 open at the bottom end, includes a plurality of internal channels housing a pair of sets of post-tensioning tendons: a first set of post-tensioning tendons 125 and a second set of post-tensioning tendons 130. The longitudinal axis of the cylindrical structure 100 is also the longitudinal axis of the concrete suction anchor.

The post-tensioning tendons 125 of the first set, and related housing internal channels of the cylindrical structure 100, are arranged according to a three-dimensional (3D) helicoidal arrangement, i.e. a 3D spiral arrangement, wherein each post-tensioning tendon 125 is inclined with respect to the longitudinal axis of the concrete suction anchor by an angle that can be finely adjusted depending on the specific application of the concrete suction anchor, that for common applications is typically equal to 45° (i.e., +45° considering a positive angle the one that is defined going counterclockwise from the longitudinal axis of the concrete suction anchor to the post-tensioning tendon 125). The post-tensioning tendons 130 of the second set, and related housing internal channels of the cylindrical structure 100, are arranged according to a three-dimensional (3D) helicoidal arrangement, i.e. a 3D spiral arrangement, wherein each post-tensioning tendon 130 is inclined with respect to the longitudinal axis of the concrete suction anchor by an opposite angle with respect to the inclination angle of the post-tensioning tendon 125, that for common applications is typically equal to 45° in the opposite direction than the post-tensioning tendons 125 of the first set (i.e., each post-tensioning tendon 130 is inclined with respect to the longitudinal axis of the concrete suction anchor by −45° considering a negative angle the one that is defined going clockwise from the longitudinal axis of the concrete suction anchor to the post-tensioning tendon 130).

The two sets of post-tensioning tendons introduce compressive stresses into the concrete suction anchor to reduce tensile stresses resulting from applied loads including the self weight of the anchor itself, also known as dead load. In particular, the two sets of post-tensioning tendons are arranged so as to counter-rotate around the longitudinal axes of the concrete suction anchor for cancelling any tangential stresses related to the post-tensioning and for inserting axial and circumferential stresses which are opposed to those due to the load during usual operation.

It must be noted that other embodiments of the concrete suction anchor can have the first set of post-tensioning tendons 125 and the second set of post-tensioning tendons 130 which are arranged differently from a three-dimensional (3D} helicoidal arrangement, e.g. because no post-tensioning tendons defines any helix along the cylindrical structure 100, and/or which are neither parallel nor orthogonal to the longitudinal axis of the concrete suction anchor, thereby the first set of post-tensioning tendons 125 and the second set of post-tensioning tendons 130 are inclined with respect to the longitudinal axis of the concrete suction anchor by opposite angles even different from 45°, namely by any angle larger than 0° and lower than 90°, optionally larger than 15° and lower than 75°, more optionally larger than 30° and lower than 60°, still remaining within the scope of protection of the present invention.

Further, it must be noted that other embodiments of the concrete suction anchor can have more than one pair of counter rotating sets of post-tensioning tendons, still remaining within the scope of protection of the present invention.

The concrete suction anchor can be manufactured through 3D concrete printing or other manufacturing technique such as precasting or on-site casting. Advantageously, the cylindrical structure 100 of the concrete suction anchor can be formed by two or more cylindrical modules, optionally pre-cast ones, the lateral cylindrical wall of each one of which includes a plurality of internal passages, each of which forms a section of an internal channel configured to house a section of a related post-tensioning tendons; in this case, the ends of the plurality of internal passages of a cylindrical module are aligned with those of adjacent cylindrical module(s) so as to form the plurality of internal channels. After post-tensioning, the post-tensioning tendons firmly maintain said two or more cylindrical modules together to form the cylindrical structure 100 of the concrete suction anchor.

Advantageously, the post-tensioning tendons 125 and 130 are made of steel, such as ultra-high-strength steel strands, and post-tensioning is applied thereto by conventional anchorage wedges placed at the ends of each internal channel, e.g., at ring plates fixed at the ends of the cylindrical structure 100 of the concrete suction anchor. To apply the proper amount of compressive stresses into the concrete suction anchor by means of the post-tensioning tendons 125 and 130, it is sufficient to carry out conventional examinations in all operating conditions at the service limit state, ultimate limit state, fatigue limit state on the concrete (both the most compressed part and the minimally compressed or possibly tensioned part), on non-prestressed steel (maximum tension action) and on prestressing cables (maximum tension action}. Advantageously, both effects similar to the beam-like behavior of the whole concrete suction anchor and shell-like behavior on the walls thereof due to internal and external pressures are taken into account; also, local effects due to concentrated loads (such as those applied on the padeye area) are taken into consideration. In particular, the proper amount of compressive stresses into the concrete suction anchor by means of the post-tensioning tendons 125 and 130 may be determined as disclosed by G. T. Houlsby and B. W. Byrne in «Design Procedures for installation of suction caissons in clay and other materials», Proceedings of the Institution of Civil Engineers-Geotechnical Engineering, Vol. 159, issue 3, 1 Jul. 2005, by the authors of "Suction Installed Caisson Foundations for Offshore Wind: Design Guidelines>> February 2019, and by J. D. Murff and J. M. Hamilton in «P-Ultimate for undrained analysis of laterally loaded piles», Journal of Geotechnical Engineering, vol. 119, issue 1, January 1993.

Figure 2:
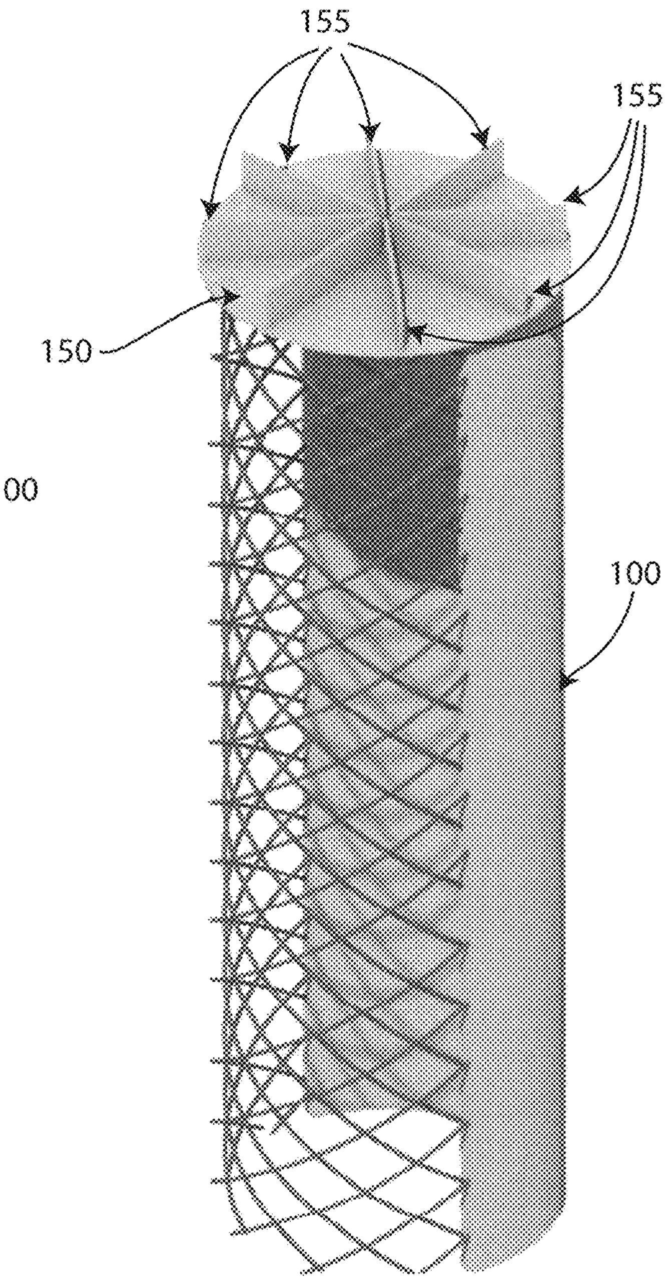
FIG. 2 shows a sectional perspective view along a plane parallel to and passing through the longitudinal axis of a second embodiment of the concrete suction anchor according to the invention, wherein the whole post-tensioning tendons are visible.

FIG. 2 shows a second embodiment of the concrete suction anchor according to the invention differing from the first embodiment shown in FIG. 1 in that it is devoid of any top dome 105. Differently, the top end of the cylindrical section 100 is closed by a top lid 150 provided with top stiffeners 155 evenly angularly distributed over the circular cross section of the cylindrical section 100.

Figure 3:
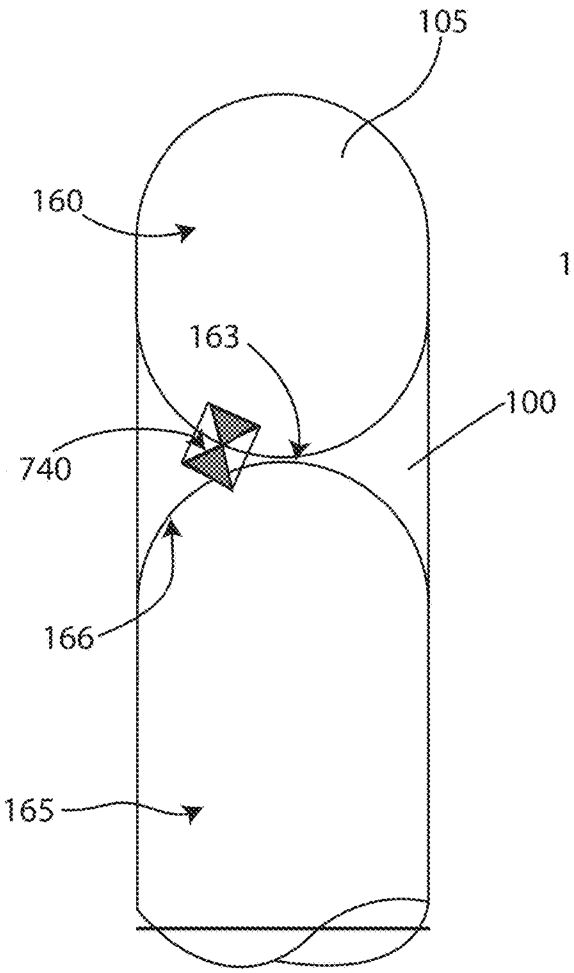
FIG. 3 shows a sectional view along a plane parallel to and passing through the longitudinal axis of a third embodiment of the concrete suction anchor according to the invention.

FIG. 3 schematically shows a third embodiment of the concrete suction anchor according to the invention differing from the first embodiment shown in FIG. 1 in that the top dome 105 defines an internal buoyancy chamber 160 having a substantially oval shape, the bottom surface 163 of which is concave, i.e. it has concavity directed towards the top surface of the oval-shaped internal buoyancy chamber 160, and in that the main cavity 165 of the cylindrical structure 100 has a top surface 166 that is a concave, i.e. it has concavity directed towards the open bottom end of the cylindrical structure 100.

Figure 4:
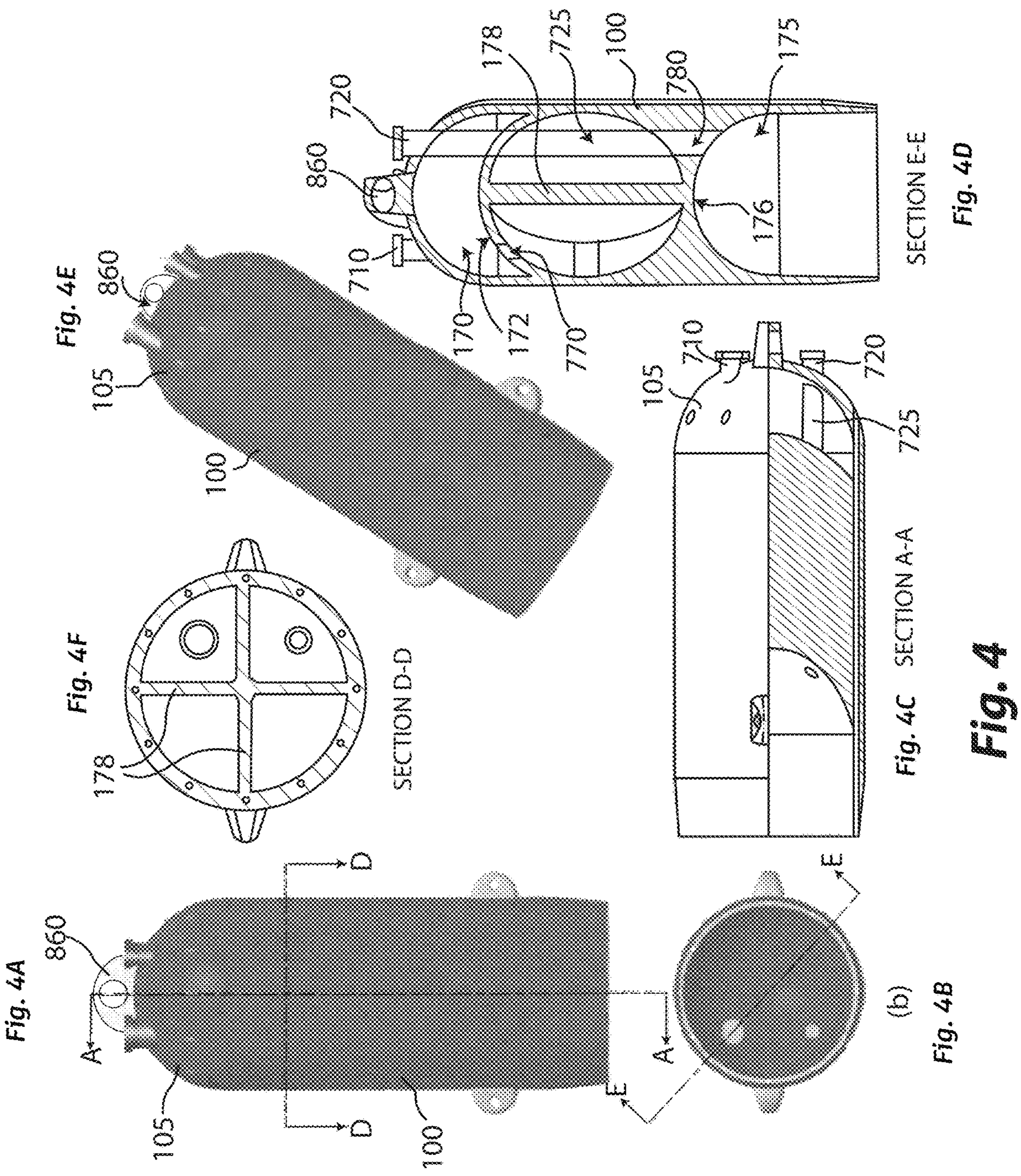
FIG. 4 shows a first side view (FIG. 4A), a top plan view (FIG. 4B), a side view partly in section according to plane AA of FIG. 4A (FIG. 4C), a sectional view according to plane EE FIG. 4B (FIG. 4D), a second side view (FIG. 4E), and a sectional view according to plane EE of FIG. 4A (FIG. 4F) of a fourth embodiment of the concrete suction anchor according to the invention.

FIG. 4 shows a fourth embodiment of the concrete suction anchor according to the invention differing from the first embodiment shown in FIG. 1 in that the top dome 105 defines a top internal buoyancy chamber 170 having a bottom surface 172 that is convex, i.e. it has concavity directed towards the open bottom end of the cylindrical structure 100, and in that the cylindrical structure 100 has an intermediate internal buoyancy chamber 174 having a substantially oval shape and provided with stiffener 178 parallel to the longitudinal axis of the concrete suction anchor which are orthogonal to each other. The intermediate internal buoyancy chamber 174 is interposed between the top internal buoyancy chamber 170 and the main cavity 175 of the cylindrical structure 100, that has a top surface 176 that is a concave, i.e. it has concavity directed towards the open bottom end of the cylindrical structure 100.

FIG. 5 shows a top dome 205 of a fifth embodiment of the concrete suction anchor according to the invention differing from the first embodiment shown in FIG. 1 in that the top dome 205 is provided with stiffener 208 parallel to the longitudinal axis of the concrete suction anchor which are evenly angularly distributed over the circular base of the top dome 205.

Figures 6, 6A, 6B, 6C, 6D, 6E, 6F:
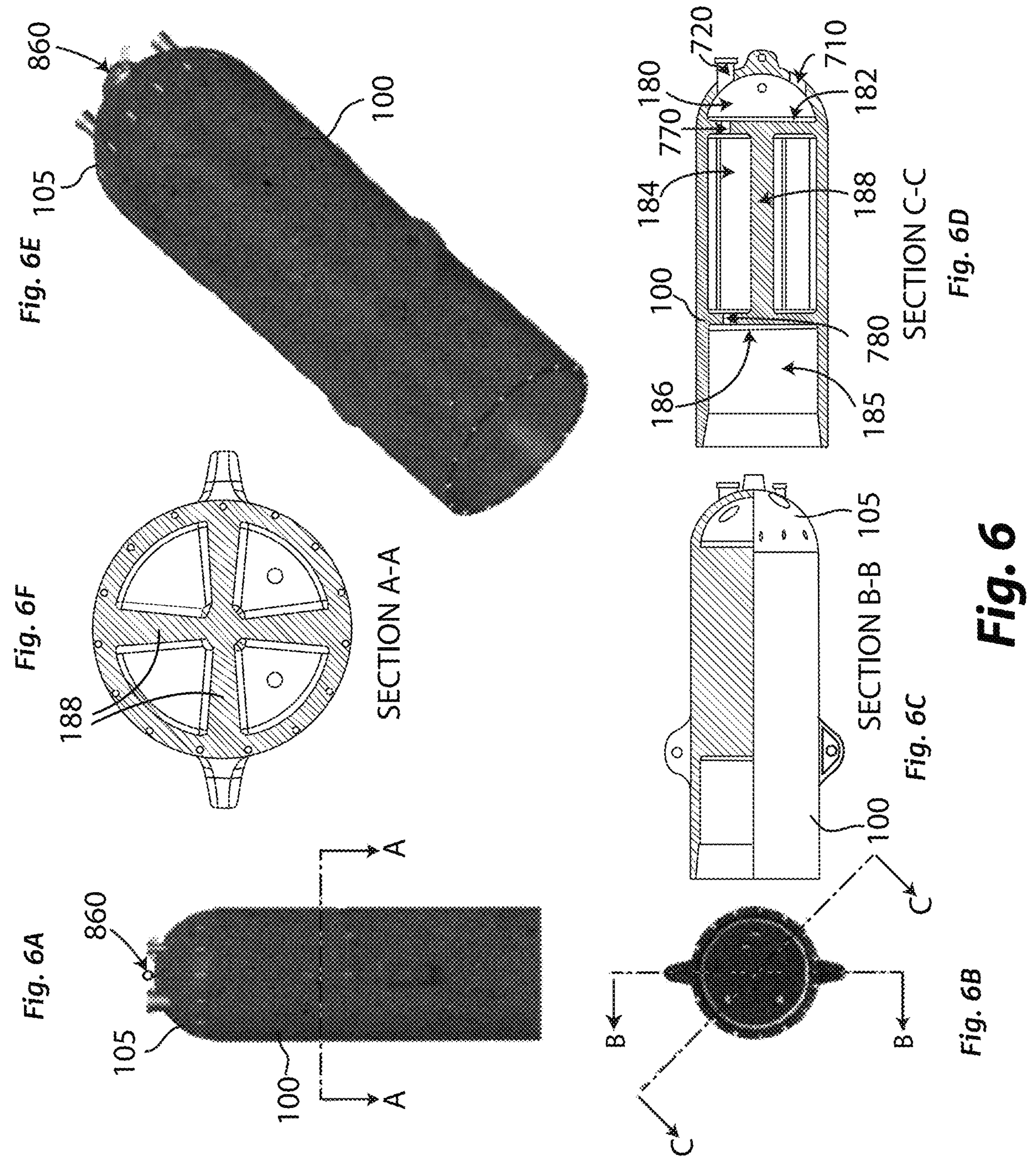
FIG. 6 shows a side view (FIG. 6A), a top plan view (FIG. 6B), a side view partly in section according to plane BB of FIG. 6B (FIG. 6C), a sectional view according to plane CC FIG. 6B (FIG. 6D), a perspective view (FIG. 6E), and a sectional view according to plane AA of FIG. 6A (FIG. 6F) of a sixth embodiment of the concrete suction anchor according to the invention.

FIG. 6 shows a sixth embodiment of the concrete suction anchor according to the invention differing from the forth embodiment shown in FIG. 4 in that the top dome 105 defines a top internal buoyancy chamber 180 having a substantially hemispherical shape with a substantially flat bottom surface 182, and in that the intermediate internal buoyancy chamber 184 has a substantially cylindrical shape and it is provided with thicker stiffener 188 parallel to the longitudinal axis of the concrete suction anchor which are still substantially orthogonal to each other. The top surface 186 of the main cavity 185 of the cylindrical structure 100 is also substantially flat.

It must be noted that other embodiments of the concrete suction anchor according to the invention can be devoid of any internal buoyancy chamber, like in the second embodiment shown in FIG. 2, even in the case where the concrete suction anchor includes a top dome, still remaining within the scope of protection of the present invention.

Figures 7, 7A, 7B, 7C, 7D:
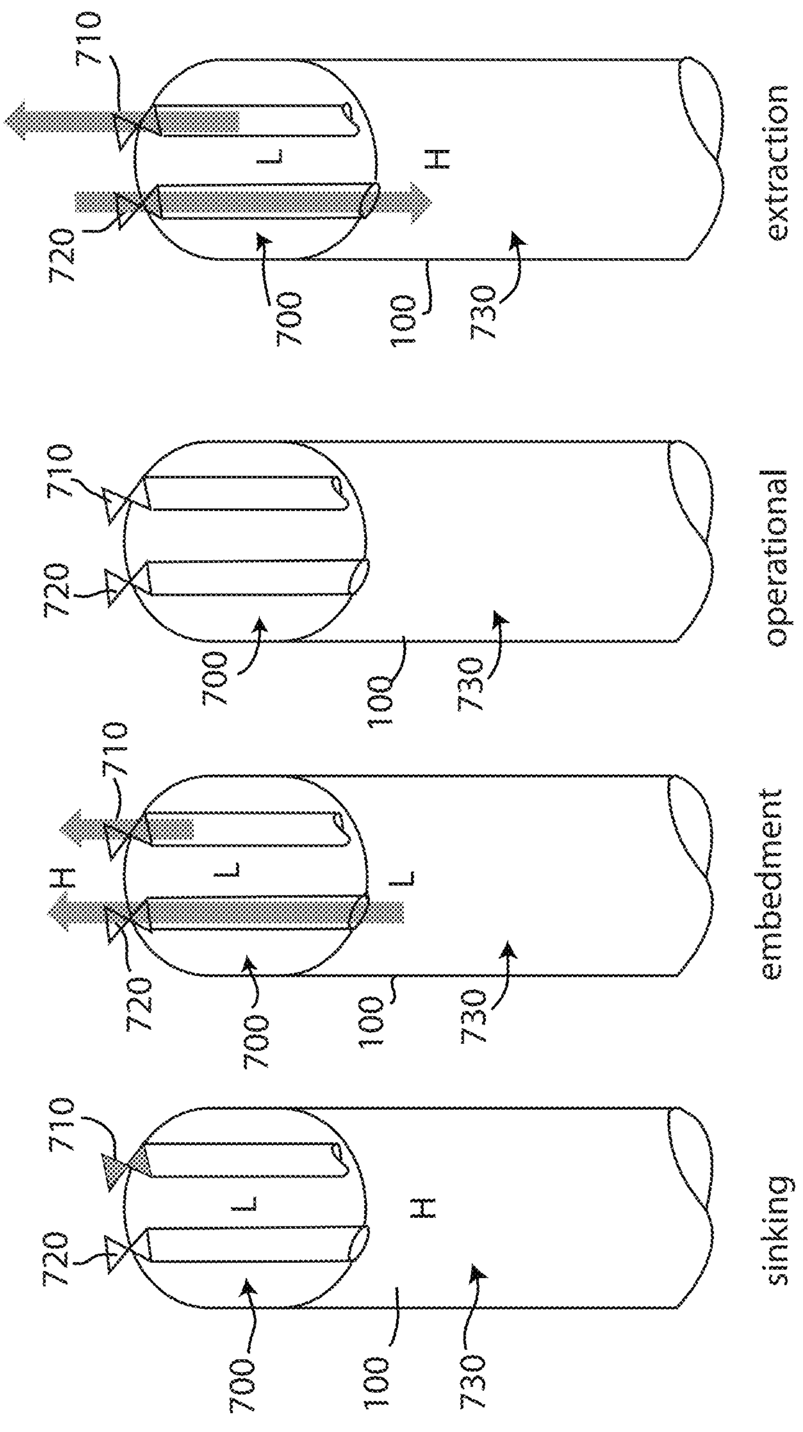
FIG. 7 schematically shows four operating conditions of the concrete suction anchor according to the invention.
FIG. 7A shows the anchor and valves in the sinking phase.
FIG. 7B shows the configuration during the embedment phase.
FIG. 7C shows the anchor and valves in their operation setting with the anchor fully embedded.
FIG. 7D shows the anchor and valve configuration during the extraction phase.

As schematically shown in FIG. 7, and also with reference to FIG. 4, the embodiments of the concrete suction anchor according to the invention including a top internal buoyancy chamber 700 have a first top valve 710, that is configured to put the top internal buoyancy chamber 700 in fluid communication with the external environment, a second top valve 720 that is configured to put the main cavity 730, acting as a suction chamber, of the cylindrical structure 100 in fluid communication with the external environment by means of a duct 725, and an internal vent 740 (not shown in FIG. 7, but schematically shown in FIGS. 3, 10*a*, 11 and 12} that puts the main cavity 730 of the cylindrical structure 100 in fluid communication with the top internal buoyancy chamber 700. The internal vent 740 can be a tunnel or built-in pipe. Advantageously, the first top valve 710 and the second top valve 720 can be controlled by a remotely operated vehicle (ROV) or otherwise remotely, and they might have connection to hoses all the way to the surface in case no ROV is used for controlling them.

As shown in FIG. 7*a*, when the concrete suction anchor is in the operating condition of sinking, the first top valve 710 is closed and the second top valve 720 is open thus putting the main cavity 730 of the cylindrical structure 100 in fluid communication with the external environment. As shown in FIG. 10*a*, such arrangement of the concrete suction anchor according to the invention allows a better control of flooding by properly operating the first top valve 710 in order to adjust the amount of air inside the top internal buoyancy chamber 700, as well as possibly inside the main cavity 730 of the cylindrical structure 100, consequently adjusting the waterline. The same technical effects are achieved by other embodiments of the concrete suction anchor including more than one internal buoyancy chamber as shown in FIG. 10*b* for the fourth embodiment of the concrete suction anchor according to the invention shown in FIG. 4, including a top internal buoyancy chamber 170 and an intermediate internal buoyancy chamber 174, wherein a top internal vent 770 puts the top internal buoyancy chamber 170 in fluid communication with the intermediate internal buoyancy chamber 174 and a bottom internal vent 780 puts the main cavity 175 of the cylindrical structure 100 in fluid communication with the intermediate internal buoyancy chamber 174; the top and bottom internal vents 770 and 780 are also shown in FIGS. 4*d* and 6*d*. Each of the top and bottom internal vents 770 and 780 can be a tunnel or built-in pipe.

As shown in FIG. 7*b*, when the concrete suction anchor is in the operating condition of embedment, both the first top valve 710 and the second top valve 720 are open, thus putting both the top internal buoyancy chamber 700 and the main cavity 730 of the cylindrical structure 100 in fluid communication with the external environment; in the operating condition of embedment, at least one suction pump is connected to the first top valve 710 and second top valve 720 so as to suck water from the top internal buoyancy chamber 700 and the main cavity 730 of the cylindrical structure 100, creating a compression on the top dome causing the concrete suction anchor to penetrate the sea soil. This is also represented in FIG. 11, wherein the first and second top valves 710 are not shown, namely showing an intermediate position of the concrete suction anchor in FIG. 11*a* and a final embedded position of the concrete suction anchor in FIG. 11*b*.

As shown in FIG. 7*c*, when the concrete suction anchor is under usual operating condition, i.e. when the concrete suction anchor is embedded in the sea or lake soil, both the first top valve 710 and the second top valve 720 are open, thus putting both the top internal buoyancy chamber 700 and the main cavity 730 of the cylindrical structure 100 in fluid communication with the external environment.

Figures 12, 12B, 12C:
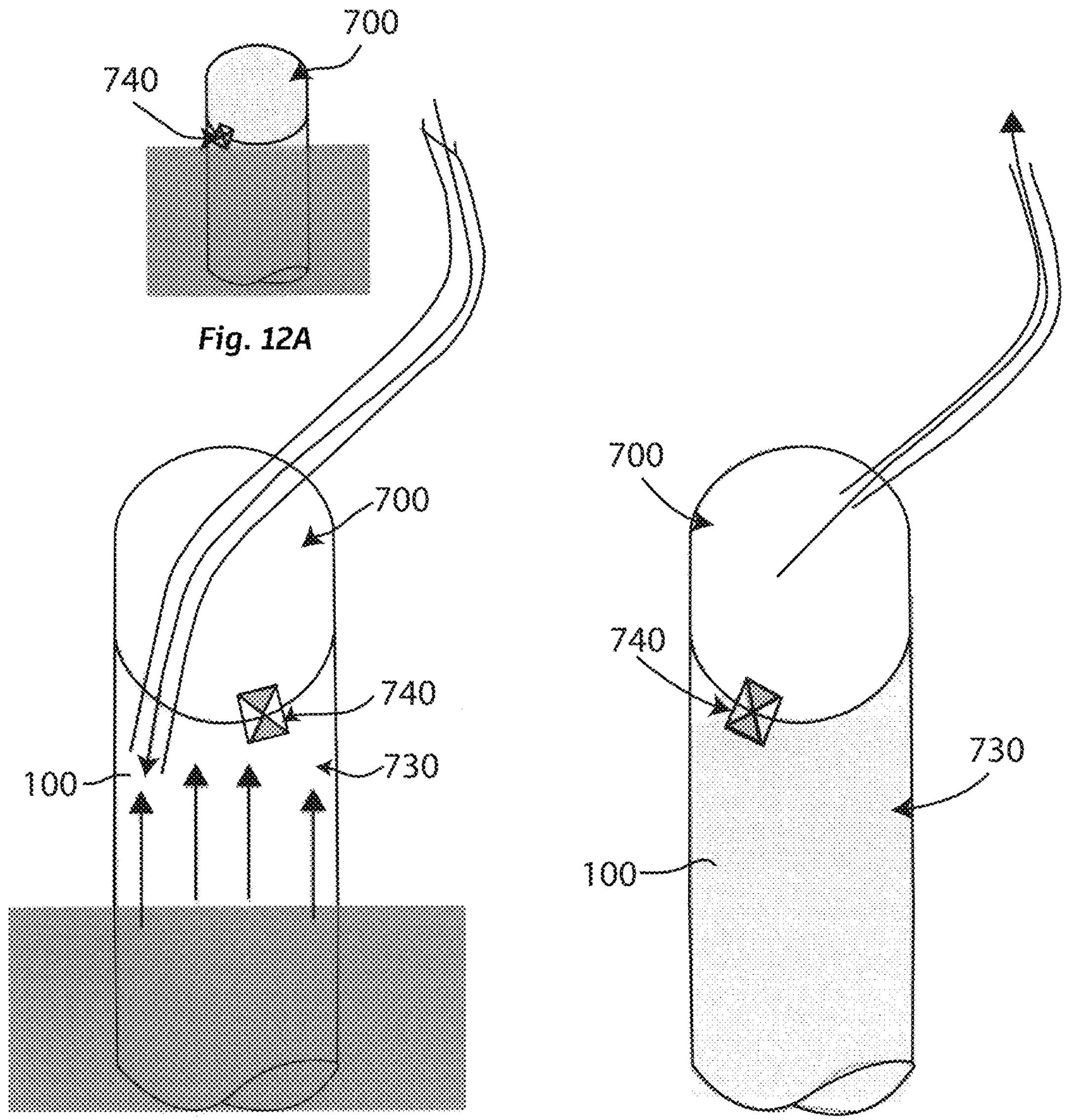

As shown in FIG. 7*d*, when the concrete suction anchor is in the operating condition of disembedment, both the first top valve 710 and the second top valve 720 are open, putting both the top internal buoyancy chamber 700 and the main cavity 730 of the cylindrical structure 100 in fluid communication with the external environment; in the operating condition of disembedment, a suction pump is connected to the first top valve 710 so as to suck water from the top internal buoyancy chamber 700, while an additional pump is connected to the second top valve 720 so as to force water into the main cavity 730 of the cylindrical structure 100. This creates a pressure on the bottom surface of the internal buoyancy chamber 700, the bottom surface causing the concrete suction anchor to be removed from the sea soil. This is also represented in FIG. 12, wherein the first and second top valves 710 are not shown, namely showing a starting embedded position of the concrete suction anchor in FIG. 12*a*, an intermediate position of the concrete suction anchor in FIG. 12*b* and a final disembedded position of the concrete suction anchor in FIG. 12*c*.

Figure 8:
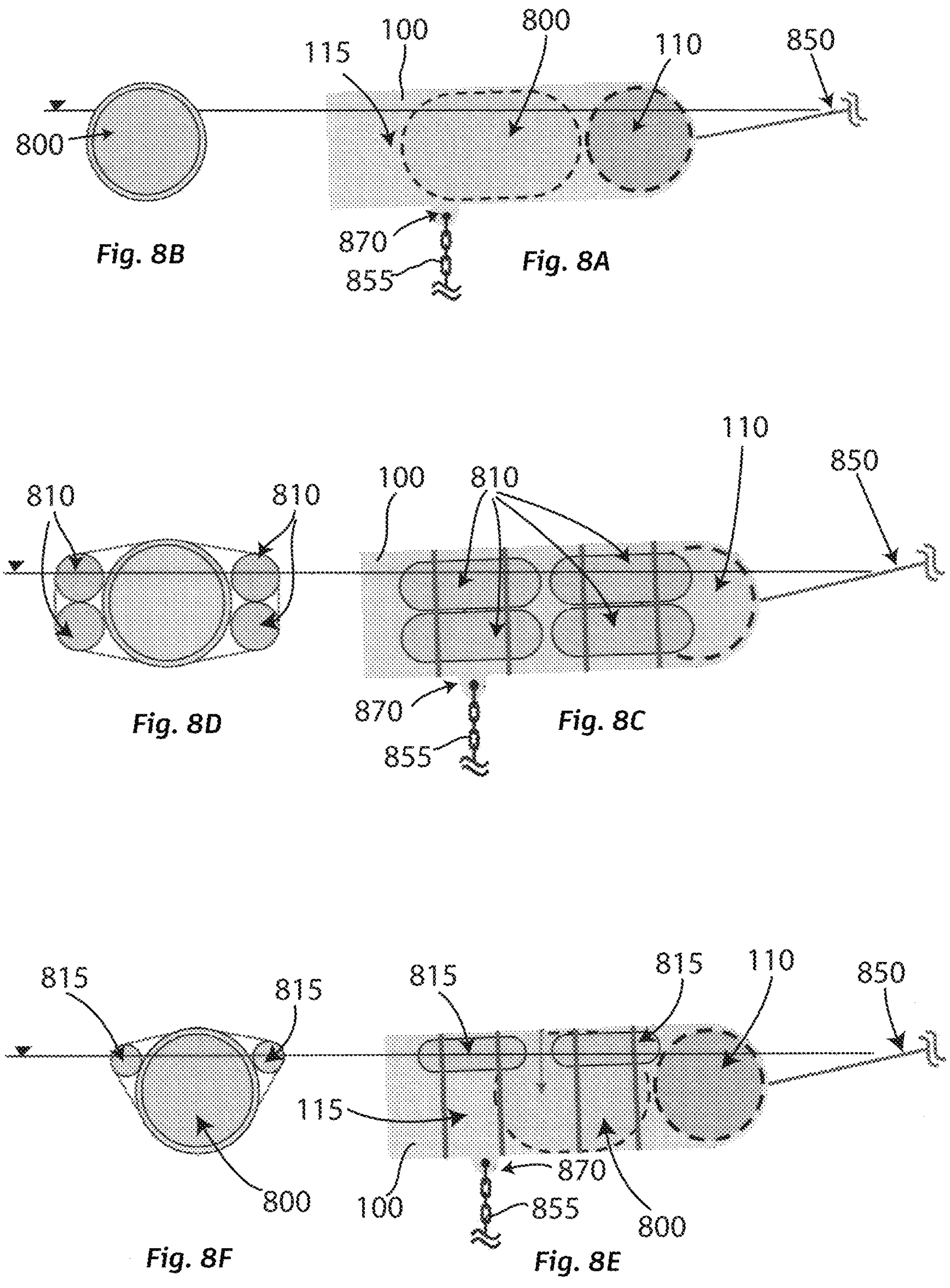
FIG. 8 Schematically shows three modes of wet-towing of the concrete suction anchor according to the invention.

The embodiments of the concrete suction anchor according to the invention including a top internal buoyancy chamber 700 can be effectively, easily and inexpensively transported via wet-towing techniques, as shown in FIGS. 8 and 9 schematically representing the concrete suction anchor of FIG. 1: the three modes of transportation shown in FIG. 8 allow the concrete suction anchor to be transported with its longitudinal axis substantially parallel to the sea or lake surface, while the three modes of transportation shown in FIG. 8 allow the concrete suction anchor to be transported with its longitudinal axis substantially orthogonal to the sea or lake surface.

A first mode of transportation is shown in FIGS. 8*a*-8*b*, wherein a main elongated inflatable buoyancy unit 800 is placed inside the main cavity 115 of the cylindrical structure 100 of the concrete suction anchor and then inflated. A towing cable 850 attached to a top eye 860, shown in FIGS. 4 and 6, is configured to pulls the concrete suction anchor. Also, a bottom chain 855 can be attached to at least one padeye 870 protruding from the lateral cylindrical wall of the cylindrical structure 100 of the concrete suction anchor.

A second mode of transportation is shown in FIGS. 8*c*-8*d*, wherein a plurality of side inflatable buoyancy units 810 are attached around the cylindrical structure 100 of the concrete suction anchor; the side inflatable buoyancy units 810 can be inflated before being attached. Advantageously, the plurality of side inflatable buoyancy units 810 are subdivided in one or more pairs, wherein the two units 810 of each pair of units 810 are attached around the cylindrical structure 100 symmetrically with respect to a plane parallel to and passing through the longitudinal axis of the concrete suction anchor. In the example of FIGS. 8*c*-8*d*, there are eight side inflatable buoyancy units 810 and the two units 810 of each pair of units 810 are attached around the cylindrical structure 100 symmetrically with respect to the longitudinal axis of the concrete suction anchor and are aligned with another unit 810 along their own longitudinal axes. Similarly to FIGS. 8*a*-8*b*, a towing cable 850 is attached to the top eye 860 for pulling the concrete suction anchor and a bottom chain 855 can be attached to at least one padeye 870 protruding from the lateral cylindrical wall of the cylindrical structure 100 of the concrete suction anchor.

A third mode of transportation, shown in FIGS. 8*e*-8*f*, is a combination of the first and second modes. In fact, a main elongated inflatable buoyancy unit 800 is placed inside the main cavity 115 of the cylindrical structure 100 of the concrete suction anchor and then inflated, and a plurality of side inflatable buoyancy units 815 are attached around the cylindrical structure 100 of the concrete suction anchor; the side inflatable buoyancy units 815 can be inflated before being attached. Advantageously, the plurality of side inflatable buoyancy units 815 are subdivided in one or more pairs, wherein the two units 815 of each pair of units 815 are attached around the cylindrical structure 100 symmetrically with respect to a plane parallel to and passing through the longitudinal axis of the concrete suction anchor. In the example of FIGS. 8*e*-8*f*, there are four side inflatable buoyancy units 815 each of which is aligned with another unit 815 along their own longitudinal axes. Similarly to FIGS. 8*a*-8*b*, a towing cable 850 is attached to the top eye 860 for pulling the concrete suction anchor and a bottom chain 855 can be attached to at least one padeye 870 protruding from the lateral cylindrical wall of the cylindrical structure 100 of the concrete suction anchor.

FIG. 9 shows three additional modes of transportation with reference to a variant of the second embodiment shown in FIG. 2, wherein the top end of the cylindrical structure 100 of the concrete suction anchor is closed by a top lid 950, advantageously made of steel, instead of a top lid 150 provided with top stiffeners 155. Such variant and the embodiment of FIG. 2 are especially used as stout anchor for sandy soils, where it is not suggestable to add buoyancy chambers not to cause the concrete suction anchor to be too big.

A fourth mode of transportation is shown in FIG. 9*a*, wherein a main inflatable buoyancy unit 900 is placed inside the main cavity 115 of the cylindrical structure 100 of the concrete suction anchor and then inflated; when inflated, the main inflatable buoyancy unit 900 occupies the top part of the main cavity 115 and is kept therein by the top lid 950. A towing cable 850 is attached to at least one padeye 870 protruding from the lateral cylindrical wall of the cylindrical structure 100 of the concrete suction anchor in correspondence of the top part of the main cavity 115, so as to be configured to pull the concrete suction anchor. Also, a bottom chain 855 can be attached to at least one padeye 870, possibly the same padeye 870 to which the towing cable 850 is attached as shown in FIG. 9*a*.

A fifth mode of transportation is shown in FIGS. 9*b*-9*c*, wherein a plurality of top inflatable buoyancy units 910 are attached around the circular edge of the top lid 950 of the concrete suction anchor; the top inflatable buoyancy units 910 can be inflated before being attached. Advantageously, the plurality of top inflatable buoyancy units 910 are evenly angularly distributed over the circumference of the circular edge of the top lid 950. In the example of FIGS. 9*b*-9*c*, there are six top inflatable buoyancy units 910, Similarly to FIG. 9*a*, a towing cable 850 is attached to at least one padeye 870 protruding from the lateral cylindrical wall of the cylindrical structure 100 of the concrete suction anchor for pulling the concrete suction anchor and a bottom chain 855 can be attached to at least one padeye 870.

A sixth mode of transportation, shown in FIGS. 9*d*-9*e*, is a combination of the fourth and fifth modes. In fact, a main inflatable buoyancy unit 900 is placed inside the main cavity 115 of the cylindrical structure 100 of the concrete suction anchor and then inflated, and a plurality of top inflatable buoyancy units 910 are attached around the circular bottom edge of the cylindrical structure 100 of the concrete suction anchor. When inflated, the main inflatable buoyancy unit 900 occupies the top part of the main cavity 115 and is kept therein by the top lid 950. The top inflatable buoyancy units 910 can be inflated before being attached. Advantageously, the plurality of top inflatable buoyancy units 910 are evenly angularly distributed over the circumference of the circular edge of the top lid 950. In the example of FIGS. 9*d*-9*e*, there are three top inflatable buoyancy units 910. Similarly to FIG. 9*a*, a towing cable 850 is attached to at least one padeye 870 protruding from the lateral cylindrical wall of the cylindrical structure 100 of the concrete suction anchor for pulling the concrete suction anchor and a bottom chain 855 can be attached to at least one padeye 870.

Similar modes of transportation using one or more inflatable buoyancy units are applicable also to other embodiments of the concrete suction anchor according to the invention which are devoid of any top internal buoyancy chamber, such as the embodiment shown in FIG. 2.

As shown in FIG. 13, direct connection of cables and chains to a padeye protruding from the lateral cylindrical wall of the cylindrical structure of the concrete suction anchor can create an important butterfly effect, that is a localized stress concentration in terms of shear and stress due to out of plane bending in the areas close to the padeye location. The padeye can be located at 30% of the length of the lateral cylindrical wall of the cylindrical structure of the concrete suction starting from the bottom of the cylindrical structure.

Figure 14:
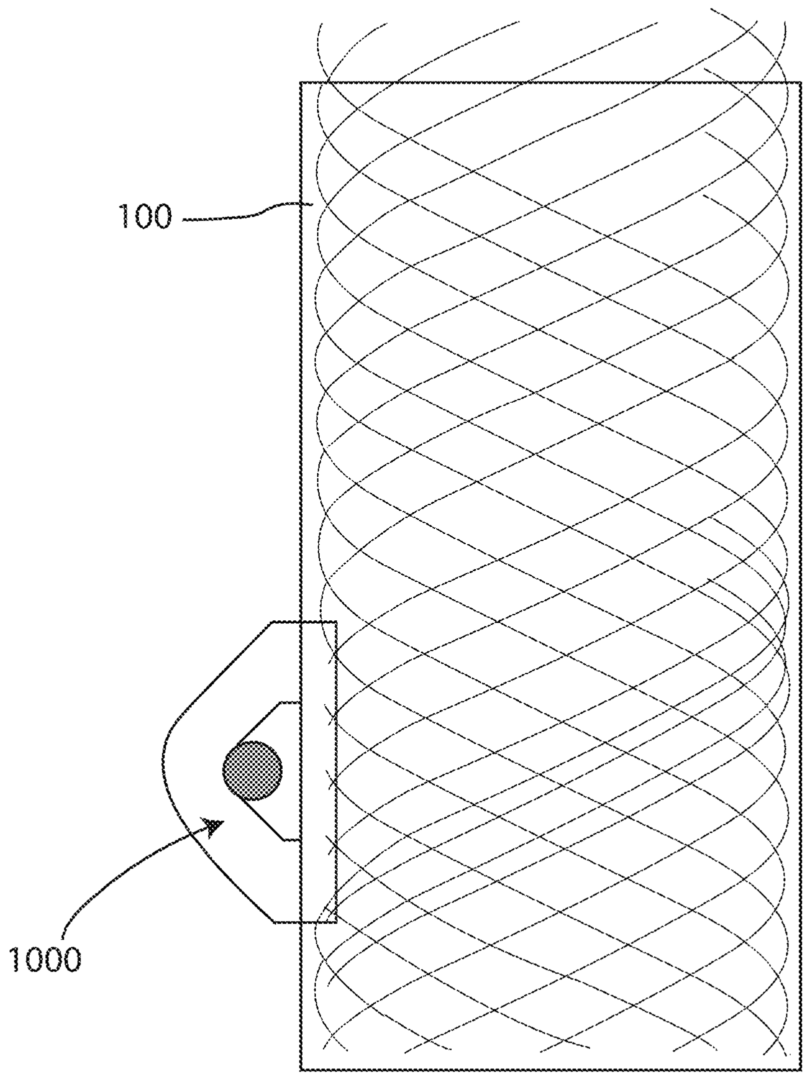
FIG. 14 shows a detail of a seventh embodiment of the concrete suction anchor according to the invention including a first variant of padeye.
Figure 15:
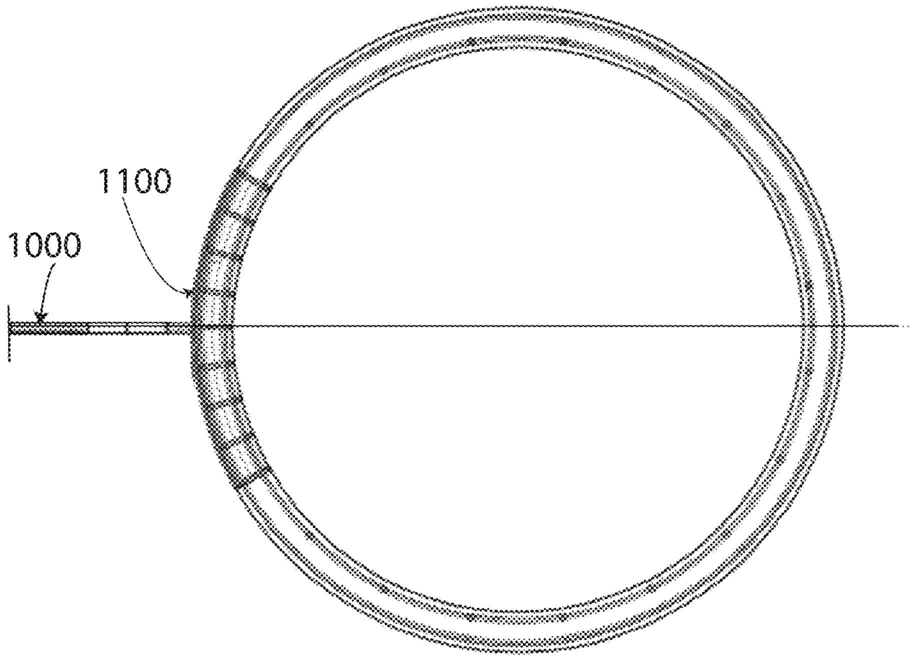
FIG. 15 shows a sectional view along a plane orthogonal to the longitudinal axis of the concrete suction anchor of FIG. 14.
Figure 16:
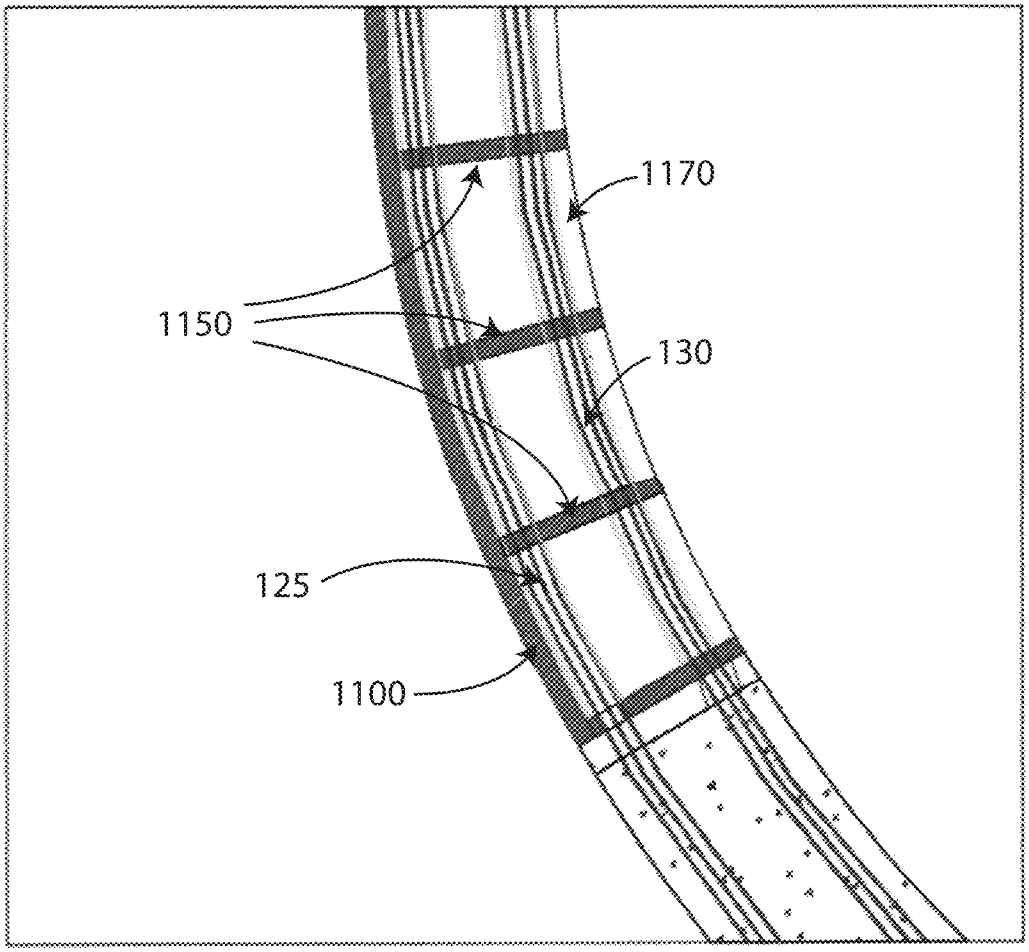
FIG. 16 shows an enlarged portion of the sectional view of FIG. 15.

Making reference to FIGS. 14-16, the seventh embodiment of the concrete suction anchor according to the invention includes a padeye 1000 protruding from a supporting plate 1100 that is incorporated into the lateral cylindrical wall of the cylindrical structure 100 of the concrete suction anchor; to this end, the lateral cylindrical wall of the cylindrical structure 100 of the concrete suction anchor has an aperture corresponding to the supporting plate 1100; the supporting plate 1100 advantageously has a shape substantially matching the lateral cylindrical wall of the cylindrical structure 100. The padeye 1000 and the supporting plate 1100 are advantageously made of steel.

The supporting plate 1100 is provided with longitudinal stiffeners 1150, which are substantially orthogonal to the supporting plate 1100 and parallel to the longitudinal axis of the cylindrical structure 100 when the supporting plate 1100 is incorporated into the lateral cylindrical wall of the cylindrical structure 100, and with transversal stiffeners 1170, which are substantially orthogonal to the supporting plate 1100 and to the longitudinal axis of the cylindrical structure 100 when the supporting plate 1100 is incorporated into the lateral cylindrical wall of the cylindrical structure 100. The supporting plate 1100 includes a plurality of internal plate channels housing sections of the post-tensioning tendons 125 and 130 of the pair of sets of post-tensioning tendons housed in the plurality of internal channels of the lateral cylindrical wall of the cylindrical structure 100 of the concrete suction anchor, as illustrated above with reference to FIG. 1. Advantageously, to allow an adjustment of the position of the supporting plate 1100 into the corresponding aperture of the lateral cylindrical wall of the cylindrical structure 100, so as to align the plurality of internal plate channels of the former with the plurality of internal channels of the lateral cylindrical wall of the cylindrical structure 100, the area of the supporting plate 1100 is slightly lower than that of the corresponding aperture and structural filling mortar is interposed between the lateral edges of the supporting plate 1100 and the edges of the corresponding aperture.

Figure 17:
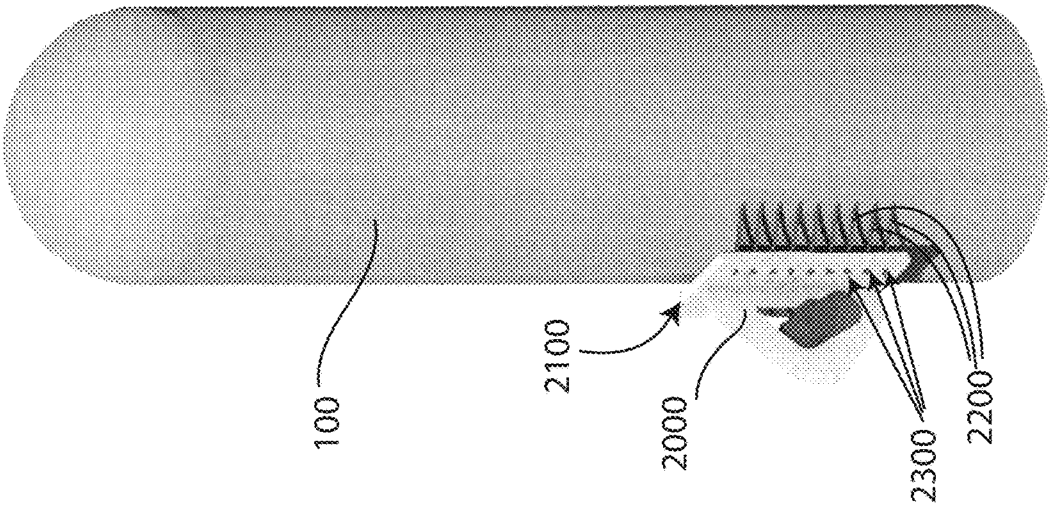
FIG. 17 shows a perspective view of an eighth embodiment of the concrete suction anchor according to the invention including a second variant of padeye.
Figure 18:
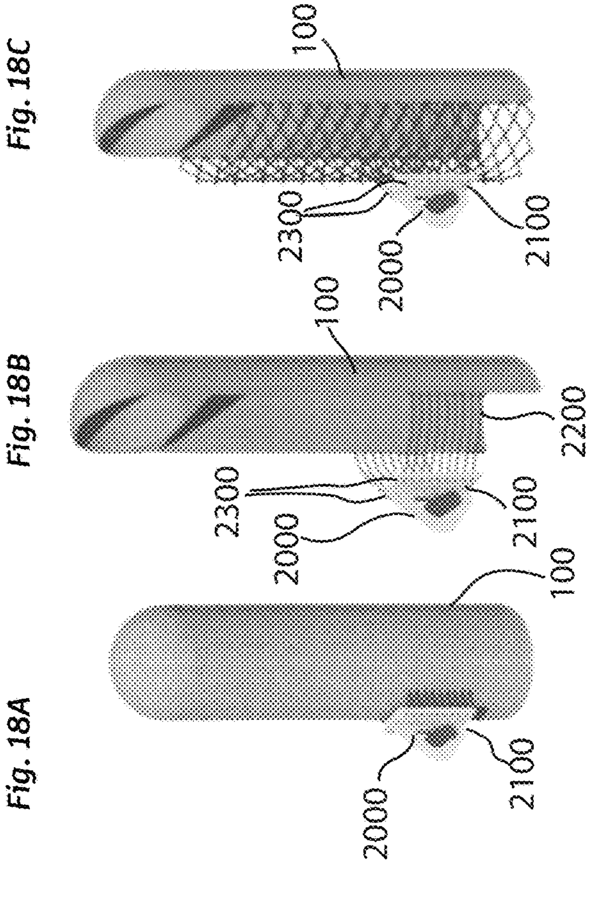
FIG. 18 shows a sectional perspective view along a plane parallel to and passing through the longitudinal axis of the concrete suction anchor of FIG. 17 wherein the whole post-tensioning tendons are visible (FIG. 18A), the sectional perspective view of FIG. 18A not showing post-tensioning tendons (FIG. 18B), and a perspective view of the concrete suction anchor of FIG. 17 (FIG. 18C).

Making reference to FIGS. 17-18, the eighth embodiment of the concrete suction anchor according to the invention includes a padeye 2000 protruding from a supporting plate 2100 that is configured to be attached to the lateral cylindrical wall of the cylindrical structure 100 of the concrete suction anchor by means of attachment tendons 2200. The attachment tendons 2200 are configured to pass through respective anchorage passages inside the lateral cylindrical wall of the cylindrical structure 100 of the concrete suction anchor; each of such anchorage passages is advantageously arranged along a respective circumference orthogonal to the longitudinal axis of the cylindrical structure 100 of the concrete suction anchor, even if this is not an essential feature of the invention and each of the anchorage passages can also move along a section of the length of the cylindrical structure 100 of the concrete suction anchor. Once introduced into said respective anchorage passages, the ends of the attachment tendons 2200 are fixed to the supporting plate 2100 by any conventional device. Advantageously, the ends of each attachment tendon 2200 is secured by conventional anchorage wedges 2300 placed at the supporting plate 2100; a post-tensioning can be applied to the attachment tendons 2200 by the anchorage wedges 2300. The supporting plate 2100 advantageously has a shape substantially matching the lateral cylindrical wall of the cylindrical structure 100. The padeye 2000 and the supporting plate 2100 are advantageously made of steel.

Figure 19:
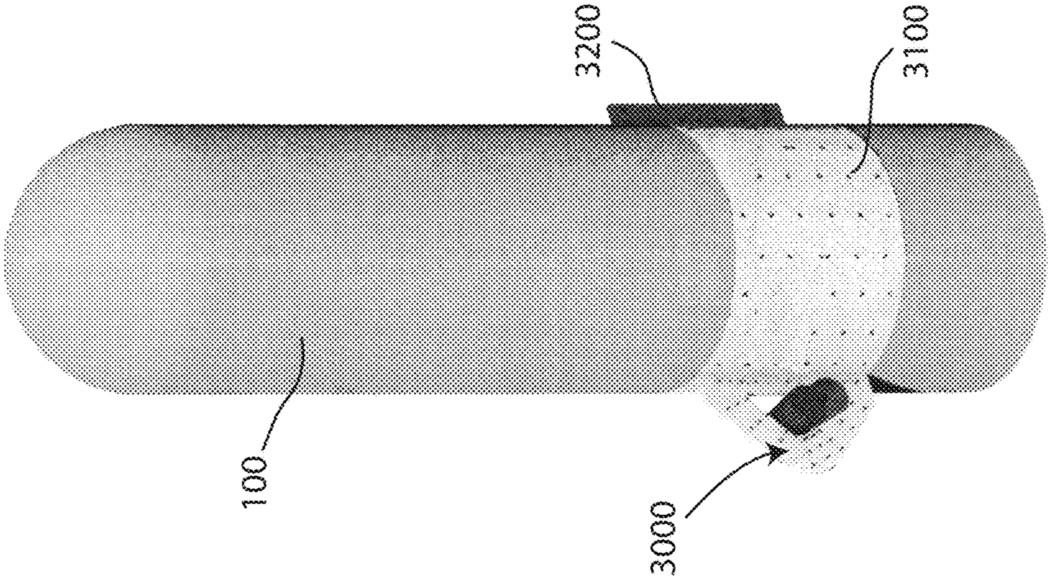
FIG. 19 shows a perspective view of a ninth embodiment of the concrete suction anchor according to the invention including a third variant of padeye.
Figure 20:
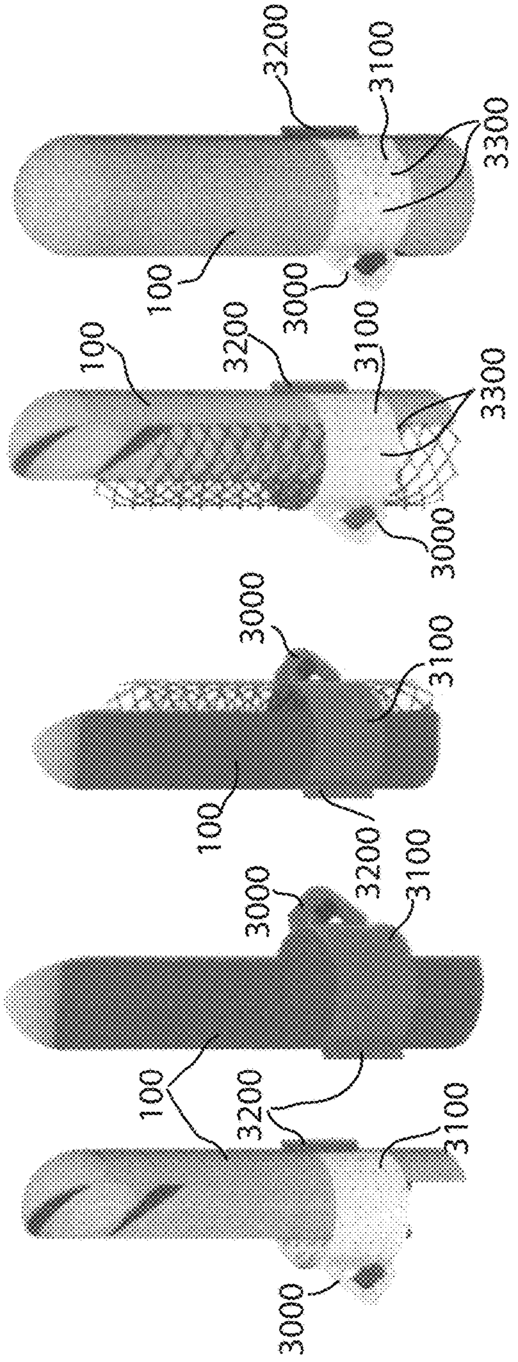

Making reference to FIGS. 19-20, the ninth embodiment of the concrete suction anchor according to the invention includes a padeye 3000 integrally coupled to two side half collars 3100 having a band cylindrical shape. The two side half collars 3100 are each provided, at their distal ends with respect to the padeye 3000, with a respective flange 3200. By attaching the flanges 3200 to each other, the two side half collars 3100 are configured to be attached, possibly in a removable manner, to the lateral cylindrical wall of the cylindrical structure 100 of the concrete suction anchor. Also, the two side half collars 3100 can be attached, possibly in a removable manner, to the lateral cylindrical wall of the cylindrical structure 100 of the concrete suction anchor by means of a plurality of fasteners 3300. The padeye 3000 and the two side half collars 3100, along with the flanges 3200, are advantageously made of steel.

It must be noted that the side half collars can have a shape different from a band cylindrical shape, for instance a prismatic shape, and that each side half collar can be replaced with one or more tie rods or tendons or circular rods.

Figure 21:
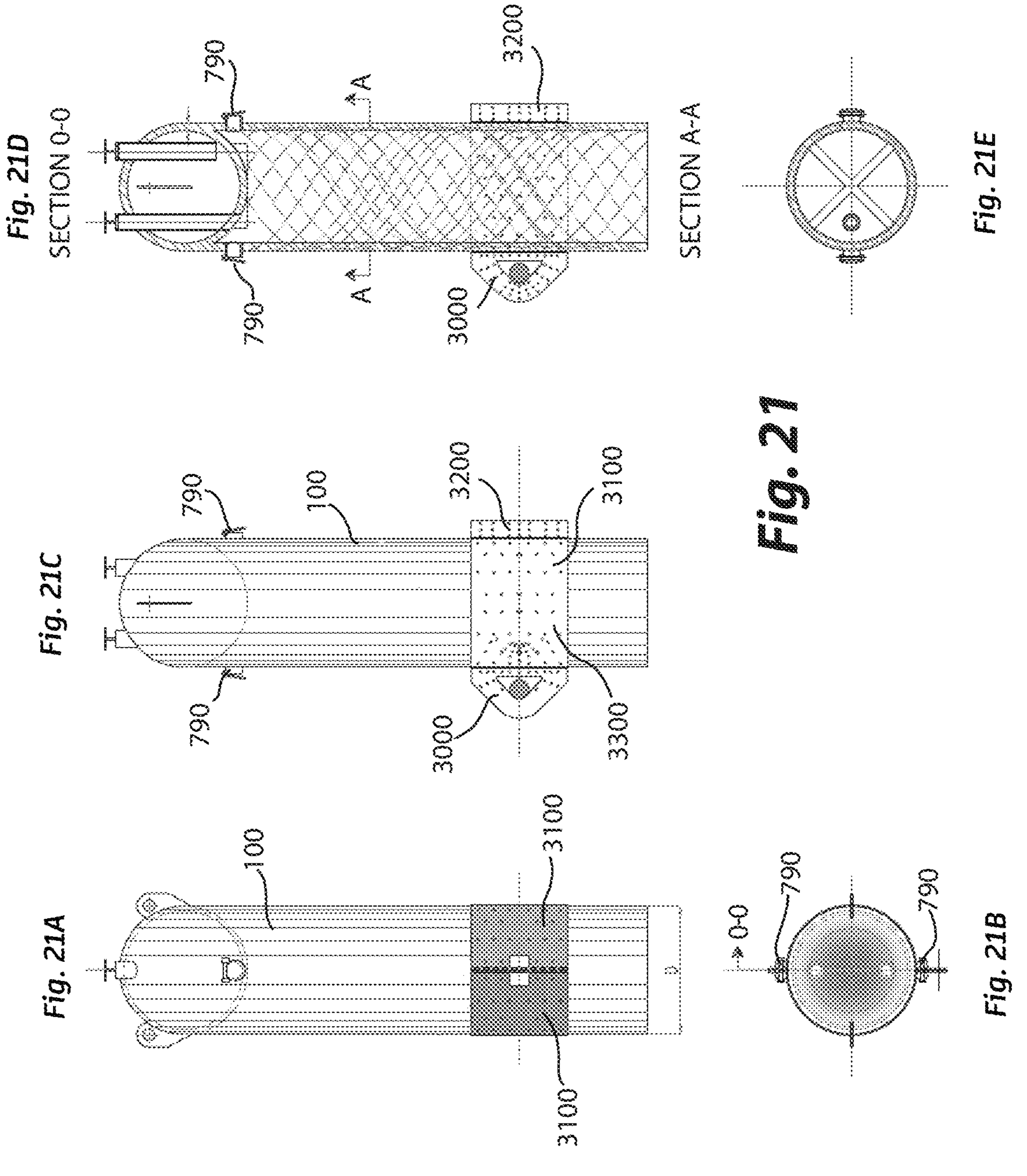
FIG. 21 shows a front view (FIG. 21A), a top plan view (FIG. 21B), a left side view (FIG. 21C), a sectional view according to plane 00 of FIG. 21B (FIG. 21C), and a sectional view according to plane AA of FIG. 21D (FIG. 21E) of a tenth embodiment of the concrete suction anchor according to the invention.

FIG. 21 shows a tenth embodiment of the concrete suction anchor according to the invention including the same padeye as shown in FIGS. 19-20, wherein the concrete suction anchor differs from the first embodiment shown in FIG. 1 in that it includes two closable side vents 790 configured to put the main cavity 115 of the cylindrical structure 100 of the concrete suction anchor in fluid communication with the external environment.

It must be noted that the configuration of the padeye of the eighth and ninth embodiments can be used independently from the embodiments of the concrete suction anchor disclosed herein.

The concrete suction anchor according to the invention achieve numerous advantages. In particular, embodiments of the present invention encompass anchoring mechanisms for floating offshore wind turbines that can be horizontally wet-towed to the site, submersed, and installed using relatively inexpensive tug boats instead of larger and costly installation vessels. Actually, the concrete suction anchor according to the invention is a hybrid towable-suction-anchor, that is a hybrid between a gravity based (deadweight) anchor and a suction anchor. The advantage of deadweight anchors of inexpensive material use and ease of deployment. However, for large lateral loads such as those developed by an offshore wind turbine, the dimensions of the anchor can become prohibitive, and its handling may require heavy-lift capacity vessels. Suction buckets or piles are an effective, removable method of anchoring structures in marine sediment by creating a negative pressure inside a steel bucket with a suction pump and generating large uplift capacity.

A medium-size, pre- or post-tensioned concrete, deadweight anchor can generate sufficient buoyancy for wet-towing with a suction skirt that can provide additional load capacity when installed.

In some embodiments, an entire system (anchor+cap) is fabricated at port by the quayside or on a submersible barge anchored by the pier. The anchor system has a structurally efficient layout, where multiple chambers allow for self-flotation and the insets distribute load across the length of the anchor. The bottom chamber is the suction chamber that will be sunk into the sea-bed, and sealed during tow-out via a reusable cap or airbag. The cap is kept in place by suction as well, and removed by flooding and pressurizing the suction chamber. The upper chambers are also sealed during tow-out and flooded during embedment. The buoyancy chamber(s) embodies at least 2 domes in order to form a spherical volume and neutralizing tensions in the walls therefore allowing for minimum or no reinforcement.

An anchor system can generate lateral capacity through passive resistance along the skirt wall. Axial capacity can be generated by friction or adhesion along the skirt, the mass of the anchor, and suction forces created if displaced vertically. The mooring line connection is located below the top of the embedded section. An anchor system can be installed with minimal impact of the environment, no acoustic noise emissions, and can be easily removed at the end of project life.

A suction skirt can be sized for a typical day soil stratigraphy and loads expected on a 15-MW turbine floating offshore wind turbine. These loads can be derived from ad-hoc simulations of a reference turbine on a semisubmersible support structure with catenary mooring.

Post-tensioning reinforcement can be used to bind the additive layers together alleviating what is often referred to as the "Z-axis challenge" for 3D printing. Post-tensioning with conventional or advanced methods of casting can be pre-installed. Post-tensioning is a reinforcement method that uses steel tendons or rods to compress a structure after curing. Post-tensioning allows thinner structural sections, longer spans between supports and stiffer walls to resist lateral and overturning loads. Because most of the loading is of a compressive nature, concrete is an excellent choice for this type of anchoring, because It is more economical than steel and with great fatigue characteristics. Anchoring systems can be designed with minimum reinforcement (other than the post-tensioning tendons) to withstand the calculated loads and that can house pressure valves and fittings.

In some cases, anchors can be configured with dimensions and mass that can be reliably embedded in the seafloor for a variety of site conditions. In some cases, anchors can have geometries that can be quickly and efficiently manufactured, e.g., through 3D concrete printing or other fabricating mean such as precasting or on-site casting, that meet all design requirements, e.g. manufacturability and structural integrity. In some cases, with regard to seakeeping and installation processes, the design geometry and buoyancy features can meet several stability and positioning requirement during wet-towing and installation without expensive heavy-lift installation vessels. One such example would be upending from the horizontal to the vertical position before installation.

Anchor embodiments can be configured to meet production rate, wet-towing draft, sufficient load capacity, scour protection, mooring line transport and storage, and other specifications or requirements. In some instances, anchors are configured for various soil conditions, e.g. shallow geology and seabed features. In other cases anchors can be configured for various water depths, e.g. ranging from 60 meters to 800 meters.

Embodiments of the present invention encompass anchors that can be wet-towed to the site, submersed, and installed with the help of an inexpensive vessel, such as a tug-boat. The anchor can be a hybrid between a gravity based (deadweight) anchor and a suction anchor. Combining a medium-sized deadweight anchor that can generate sufficient buoyancy for wet-towing and a suction skirt that can provide additional load capacity when installed delivers an innovative solution that minimizes both capital expenditure in the form of material and manufacturing costs. This can significantly reduce anchoring costs.

Embodiments of the present invention encompass anchors and related features having inherent stability when empty. The anchor lip sides can have a tapered wedge shape to promote self-embedment as well.

A hybrid anchor can generate lateral capacity through passive resistance of the soil bed along the walls of the skirt as well as at the base of the upper chamber. Axial capacity can be generated by friction or adhesion along the pile shaft, reverse bearing capacity at the bottom of the skirt, and inner pressure deficit. A mooring line connection can be located below the top of the pile and it can vary from ½ to ⅓ of pile penetration from the bottom. In contrast to some other types of pile or plate anchors, a hybrid anchor can be installed with minimal impact to the environment, and with substantially no acoustic noise emissions. Exemplary anchor embodiments can be easily removed at the end of project life.

In some cases, a hybrid anchor can be used for any turbine size. A suction skirt can be sized for a typical clay soil stratigraphy and loads associated with floating offshore wind turbines of any size. Anchors can be associated with turbines mounted on a floating substructure with either catenary, taut, or semi-taut mooring. In some instances, most of the loading is of compressive nature, and concrete is an excellent choice for this type of anchoring. This is due to it being more inexpensive than steel and with great fatigue characteristics. An upper chamber portion of the anchor can be designed to generate the needed buoyancy for transportation via wet-towing. Once flooded, the upper chamber makes up a significant portion of the deadweight, which together with the friction of the walls will deliver the needed uplift capacity under operational loading. This portion of the anchor may require minimum reinforcement. Exemplary anchor designs enable minimization of costs and may involve determining a minimum thickness of skirt. Relatedly, embodiments encompass domed buoyancy chamber mechanisms. Such configurations can create buoyancy for transport, deadweight when installed, and in any case reduce reinforcement needs as a result of the dome and counter-dome principle (e.g., similar to an arch effect, where pressure loading goes into compression only).

Anchor embodiments of the present invention enable offshore wind development to move away from the relatively limited shallow water sites to deep water ones. Exemplary anchor embodiments can enable floating wind systems that provide advantages over fixed-bottom structures. 60% of the U.S. offshore wind resource is in deep waters, namely with depth greater than 60 meters. Floating wind techniques can be more competitive than fixed-bottom techniques in water depths greater than 50 meters. With normal pile anchors, material costs can be high and vessel transportation is expensive. Hybrid embodiments disclosed herein provide significant advantages over currently available approaches. An exemplary hybrid suction-gravity based anchor, made up of efficiently manufactured concrete, with embedded buoyancy for wet-towing to the installation site, achieves low material and construction cost while delivering an economical installation process that can revolutionize the anchoring market.

A padeye can be configured as an eyelet where the mooring line connects to the anchor. Exemplary padeye embodiments disclosed herein are well suited for use with concrete anchors, and in particular provide connection mechanisms or modalities that engage the concrete.

While the above provides a full and compete illustration of exemplary embodiments of the present invention, various modifications, alternate constructions and equivalents may be employed as desired. Consequently, although the embodiments have been described in some detail, by way of example and for clarity of understanding, a variety of modification, changes, and adaptions will be obvious to those of skill in the art. Accordingly, the above description and illustrations should not be construed as limiting the scope of protection thereof, as defined by the attached claims.

The invention claimed is:

1. A concrete suction anchor including a cylindrical structure that has a lateral cylindrical wall and a longitudinal axis, wherein the cylindrical structure is open at a bottom end and closed at a top end, wherein the cylindrical structure defines a main cavity open at the bottom end, wherein said lateral cylindrical wall of the cylindrical structure includes a plurality of internal channels housing at least one pair of sets of post-tensioning tendons, wherein a first set of post-tensioning tendons is inclined with respect to said longitudinal axis by a first angle opposite to a second angle according to which a second set of post-tensioning tendons is inclined with respect to said longitudinal axis, wherein each of said first and second angles has an absolute value larger than 0° and lower than 90°;

wherein said top end of the cylindrical structure is closed by a top dome defining a top internal buoyancy chamber separated from the main cavity, wherein an internal vent puts the main cavity in fluid communication with the top internal buoyancy chamber, wherein a first top valve is configured to put the top internal buoyancy chamber in fluid communication with an external environment and a second top valve is configured to put the main cavity in fluid communication with the external environment by means of a duct.

2. The concrete suction anchor according to claim 1, wherein each of said first and second angles has an absolute value larger than 15° and lower than 75°.

3. The concrete suction anchor according to claim 1, wherein said plurality of internal channels houses two or more pairs of sets of post-tensioning tendons.

4. The concrete suction anchor according to claim 1, wherein the post-tensioning tendons of the first set, the post-tensioning tendons of the second set, and said plurality of internal channels are arranged according to three-dimensional (3D) helicoidal arrangements.

5. The concrete suction anchor according to claim 1, wherein post-tensioning is applied to said at least one pair of sets of post-tensioning tendons by anchorage wedges placed at the ends of each one of said plurality of internal channels, wherein said anchorage wedges are placed at ring plates fixed at the ends of the cylindrical structure.

6. The concrete suction anchor according to claim 1, wherein the concrete suction anchor is formed by two or more cylindrical modules, the lateral cylindrical wall of each one of which includes a plurality of internal passages, wherein each of said plurality of internal passages of said lateral cylindrical wall of each one of said two or more cylindrical modules forms a section of an internal channel of said plurality of internal channels.

7. The concrete suction anchor according to claim 1, wherein said top end of the cylindrical structure is closed by a top lid.

8. The concrete suction anchor according to claim 1, further comprising a padeye protruding from a supporting plate that is incorporated into said lateral cylindrical wall, wherein the supporting plate is received in a corresponding aperture of said lateral cylindrical wall, wherein the supporting plate includes a plurality of internal plate channels housing sections of at least part of said post-tensioning tendons of said at least one pair of sets of post-tensioning tendons.

9. The concrete suction anchor according to claim 8, wherein the supporting plate is provided with:

longitudinal stiffeners, which are substantially orthogonal to the supporting plate and parallel to said longitudinal axis, and/or transversal stiffeners, which are substantially orthogonal to the supporting plate and to said longitudinal axis.

10. The concrete suction anchor according to claim 1, further comprising a padeye protruding from a supporting plate that is configured to be attached to said lateral cylindrical wall by means of attachment tendons passing through respective anchorage passages inside said lateral cylindrical wall, wherein the ends of each attachment tendon are fixed to the supporting plate by anchorage devices placed at the supporting plate.

11. The concrete suction anchor according to claim 10, wherein each of such anchorage passages is arranged along a respective circumference orthogonal to said longitudinal axis.

12. The concrete suction anchor according to claim 10, wherein at least one of said anchorage devices is an anchorage wedges, wherein said anchorage wedges applies a post-tensioning to a respective attachment tendon.

13. The concrete suction anchor according to claim 1, further comprising a padeye integrally coupled to two side half collars, having a band cylindrical shape, wherein the two side half collars are each provided, at their distal ends with respect to the padeye, with a respective flange, wherein the flanges are attached to each other, thereby the two side half collars are attached, in a removable manner, to said lateral cylindrical wall, wherein the two side half collars are attached in a removable manner, to said lateral cylindrical wall by means of a plurality of fasteners.

14. The concrete suction anchor according to claim 1, wherein each of said first and second angles has an absolute value larger than 30° and lower than 60°.

15. The concrete suction anchor according to claim 1, wherein each of said first and second angles has an absolute value equal to 45°.

16. A concrete suction anchor including a cylindrical structure that has a lateral cylindrical wall and a longitudinal axis, wherein the cylindrical structure is open at a bottom end and closed at a top end, wherein the cylindrical structure defines a main cavity open at the bottom end, wherein said lateral cylindrical wall of the cylindrical structure includes a plurality of internal channels housing at least one pair of sets of post-tensioning tendons, wherein a first set of post-tensioning tendons is inclined with respect to said longitudinal axis by a first angle opposite to a second angle according to which a second set of post-tensioning tendons is inclined with respect to said longitudinal axis, wherein each of said first and second angles has an absolute value larger than 0° and lower than 90°; and wherein said top end of the cylindrical structure is closed by a top dome defining a top internal buoyancy chamber, wherein the cylindrical structure has an intermediate internal buoyancy chamber that is interposed between the top internal buoyancy chamber and the main cavity, wherein a top internal vent puts the top internal buoyancy chamber in fluid communication with the intermediate internal buoyancy chamber and a bottom internal vent puts the main cavity in fluid communication with the intermediate internal buoyancy chamber.

17. A concrete suction anchor including a cylindrical structure that has a lateral cylindrical wall and a longitudinal axis, wherein the cylindrical structure is open at a bottom end and closed at a top end, wherein the cylindrical structure defines a main cavity open at the bottom end, wherein said lateral cylindrical wall of the cylindrical structure includes a plurality of internal channels housing at least one pair of sets of post-tensioning tendons, wherein a first set of post-tensioning tendons is inclined with respect to said longitudinal axis by a first angle opposite to a second angle according to which a second set of post-tensioning tendons is inclined with respect to said longitudinal axis, wherein each of said first and second angles has an absolute value larger than 0° and lower than 90°; and wherein said top end of the cylindrical structure is closed by a top dome defining a top internal buoyancy chamber separated from the main cavity, wherein an internal vent puts the main cavity in fluid communication with the top internal buoyancy chamber.

* * * * *